United States Patent
Kamei et al.

(10) Patent No.: US 7,177,036 B2
(45) Date of Patent: Feb. 13, 2007

(54) IMAGE PROCESSING SYSTEM FOR READING AND PROCESSING IMAGES

(75) Inventors: Nobuo Kamei, Toyokawa (JP); Hideaki Mizuno, Toyokawa (JP); Hideyuki Toriyama, Toyokawa (JP); Hiroyuki Suzuki, Toyokawa (JP); Tsuyoshi Yoneyama, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 1245 days.

(21) Appl. No.: 09/726,535

(22) Filed: Dec. 1, 2000

(65) Prior Publication Data

US 2002/0054304 A1 May 9, 2002

(30) Foreign Application Priority Data

| Dec. 1, 1999 | (JP) | 11-341815 |
| Dec. 1, 1999 | (JP) | 11-341816 |
| Dec. 1, 1999 | (JP) | 11-341817 |
| Dec. 1, 1999 | (JP) | 11-341818 |

(51) Int. Cl.
*G06F 3/12* (2006.01)
*G06K 15/00* (2006.01)

(52) U.S. Cl. .................. 358/1.15; 358/1.14; 358/1.13

(58) Field of Classification Search ............... 358/1.2, 358/1.4, 1.6, 1.9, 1.13, 1.15, 403, 406, 530, 358/501, 504
See application file for complete search history.

(56) References Cited

U.S. PATENT DOCUMENTS

| 5,868,666 A | 2/1999 | Okada et al. |
| 6,252,609 B1 | 6/2001 | Kanno |
| 6,388,759 B1 | 5/2002 | Yoshida |
| 6,426,800 B1 | 7/2002 | Mizuno et al. |
| 6,829,058 B1 * | 12/2004 | Kumada ................. 358/1.15 |
| 6,862,373 B2 * | 3/2005 | Enomoto .................. 382/263 |

FOREIGN PATENT DOCUMENTS

| JP | 08-320770 | 12/1996 |
| JP | 10-271080 | 10/1998 |
| JP | 11-032154 | 2/1999 |
| JP | 11-088584 | 3/1999 |
| JP | 11-112753 | 4/1999 |
| JP | 11-146105 | 5/1999 |
| JP | 11-164139 | 6/1999 |
| JP | 11-317887 | 11/1999 |

* cited by examiner

*Primary Examiner*—Douglas Q. Tran
(74) *Attorney, Agent, or Firm*—Buchanan, Ingersoll & Rooney PC

(57) ABSTRACT

An image processing system is provided that is capable of performing copying processes by connecting devices which specifications for processing image data are mutually different. In an image processing system comprised of an image reading device for optically reading original documents and converting these into electronic image data and a printing device for printing image data that have been received from the image reading device onto recording media, image processing circuits for processing image data in accordance with specified specifications are respectively incorporated into the scanning device and the printing device, and a device that may be set in accordance with specifications for processing image data based on given circuit arrangement information is used to comprise at least a part of either one of the image processing circuits of these devices. By setting the image processing circuit in accordance with specifications for processing image data on the basis of specification information of the image processing circuit of the opposing device, it is enabled to connect scanning devices and printing devices that are of mutually different specifications.

13 Claims, 19 Drawing Sheets

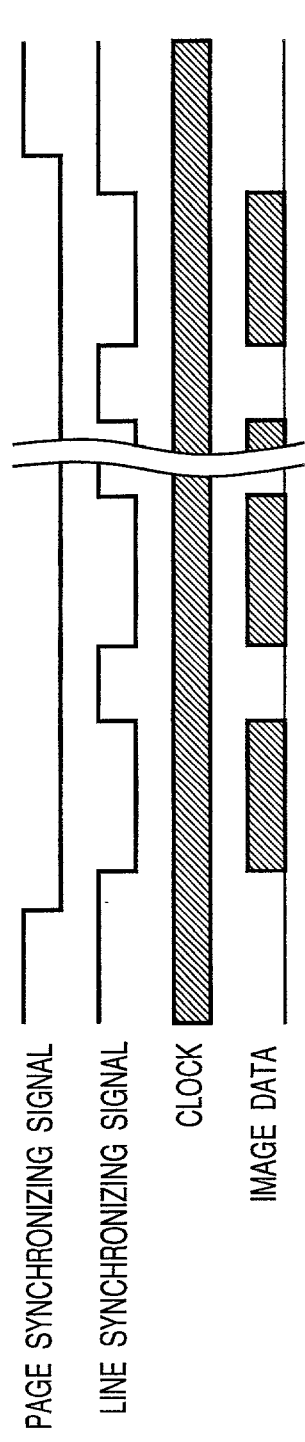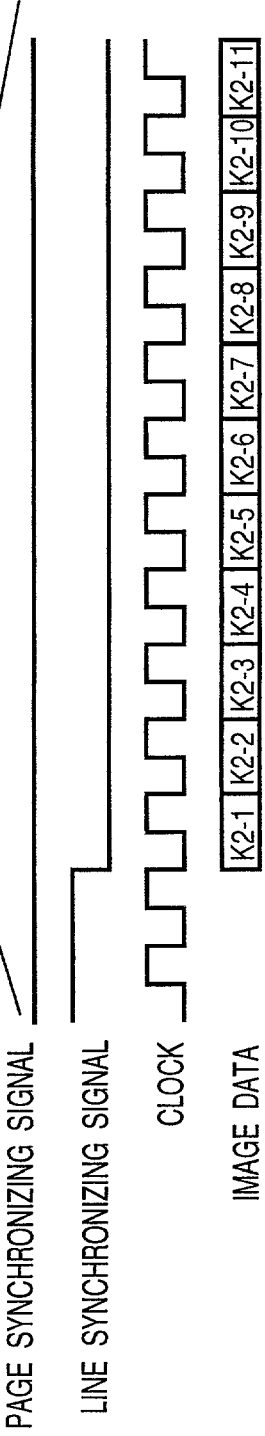

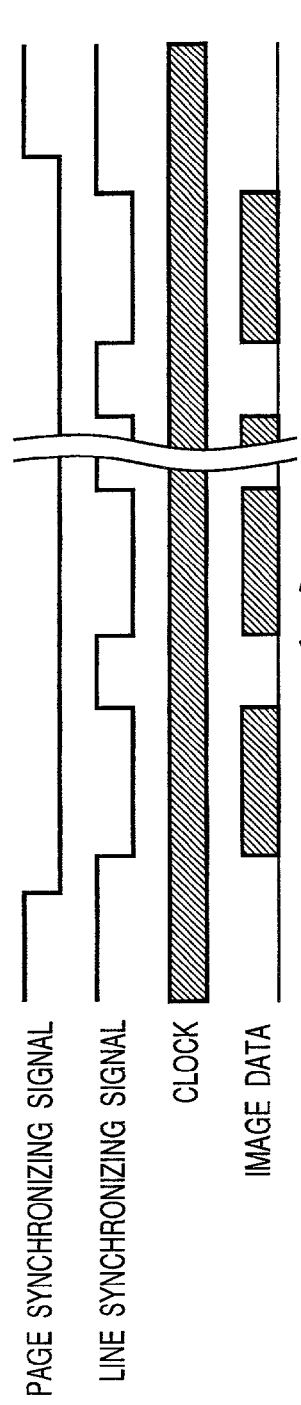
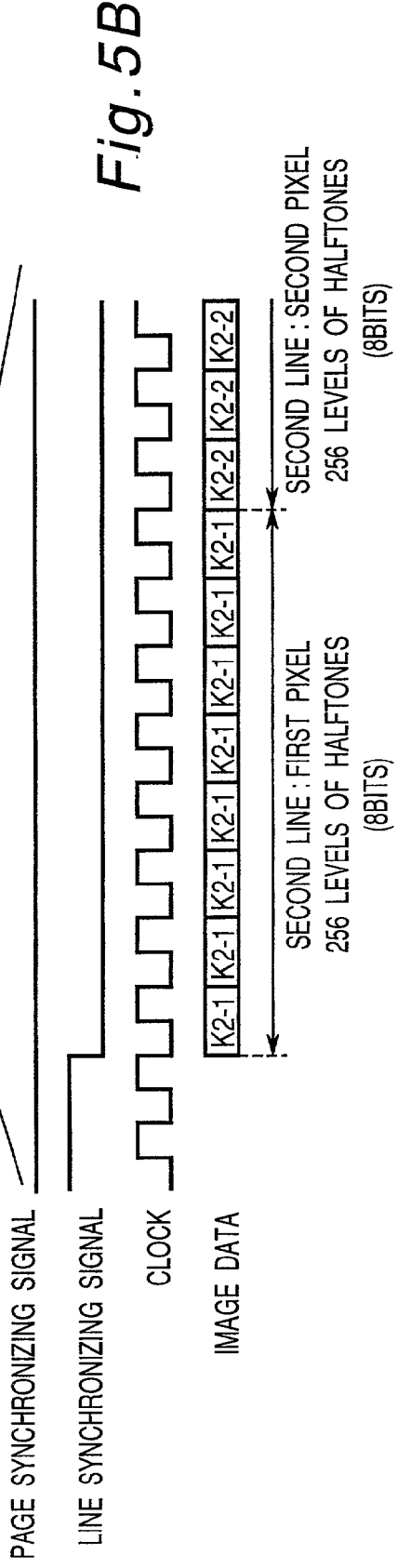

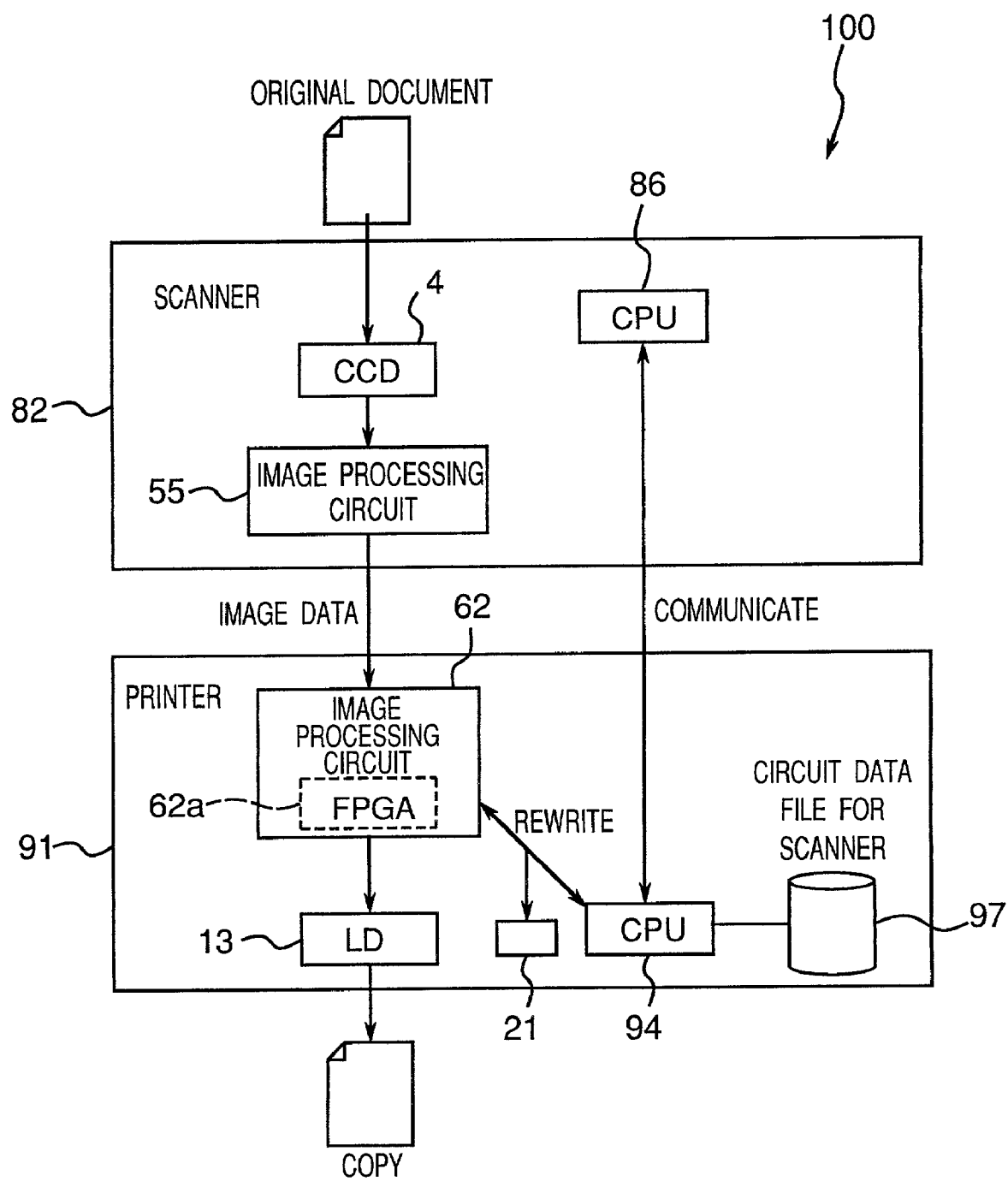

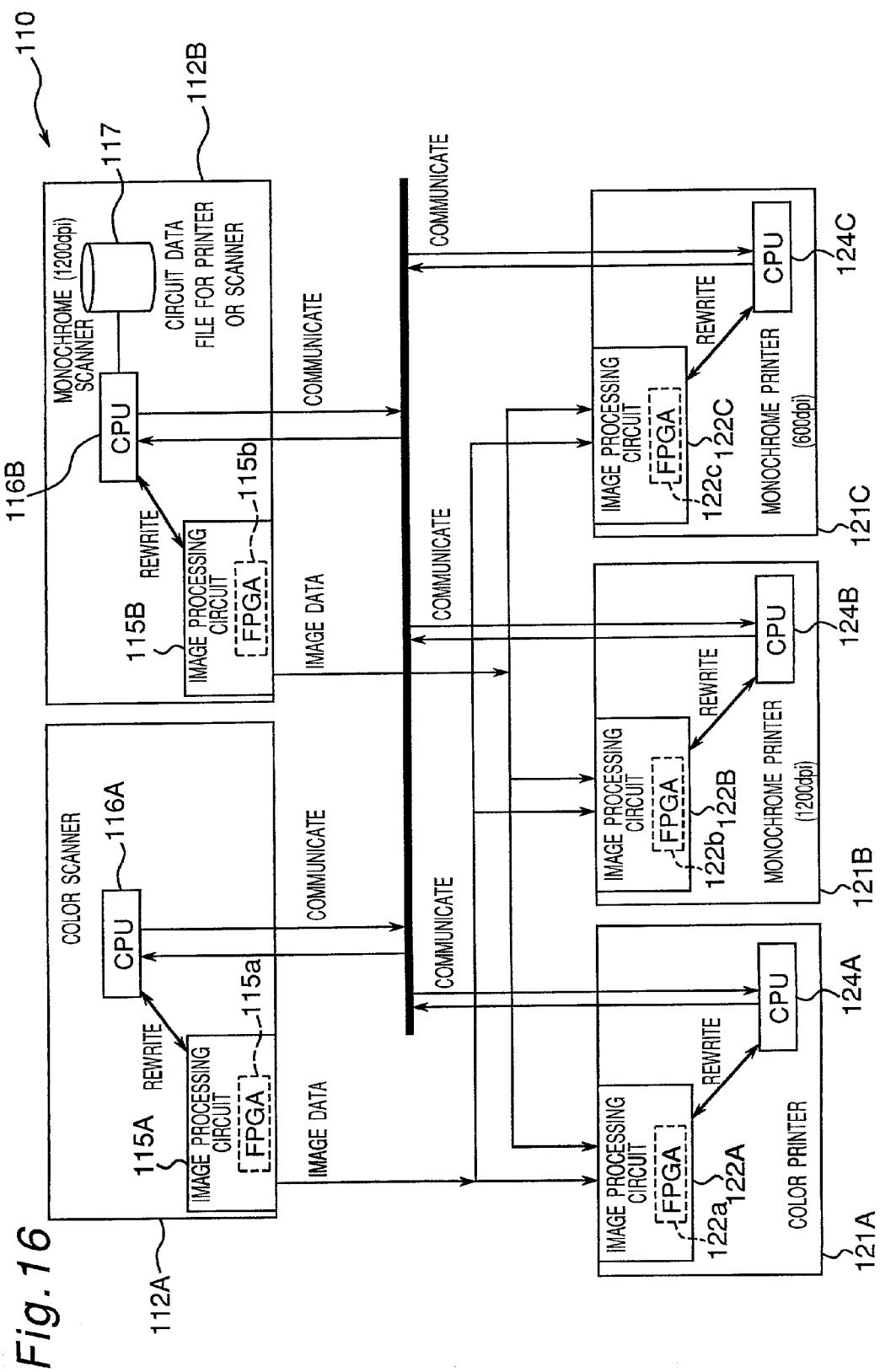

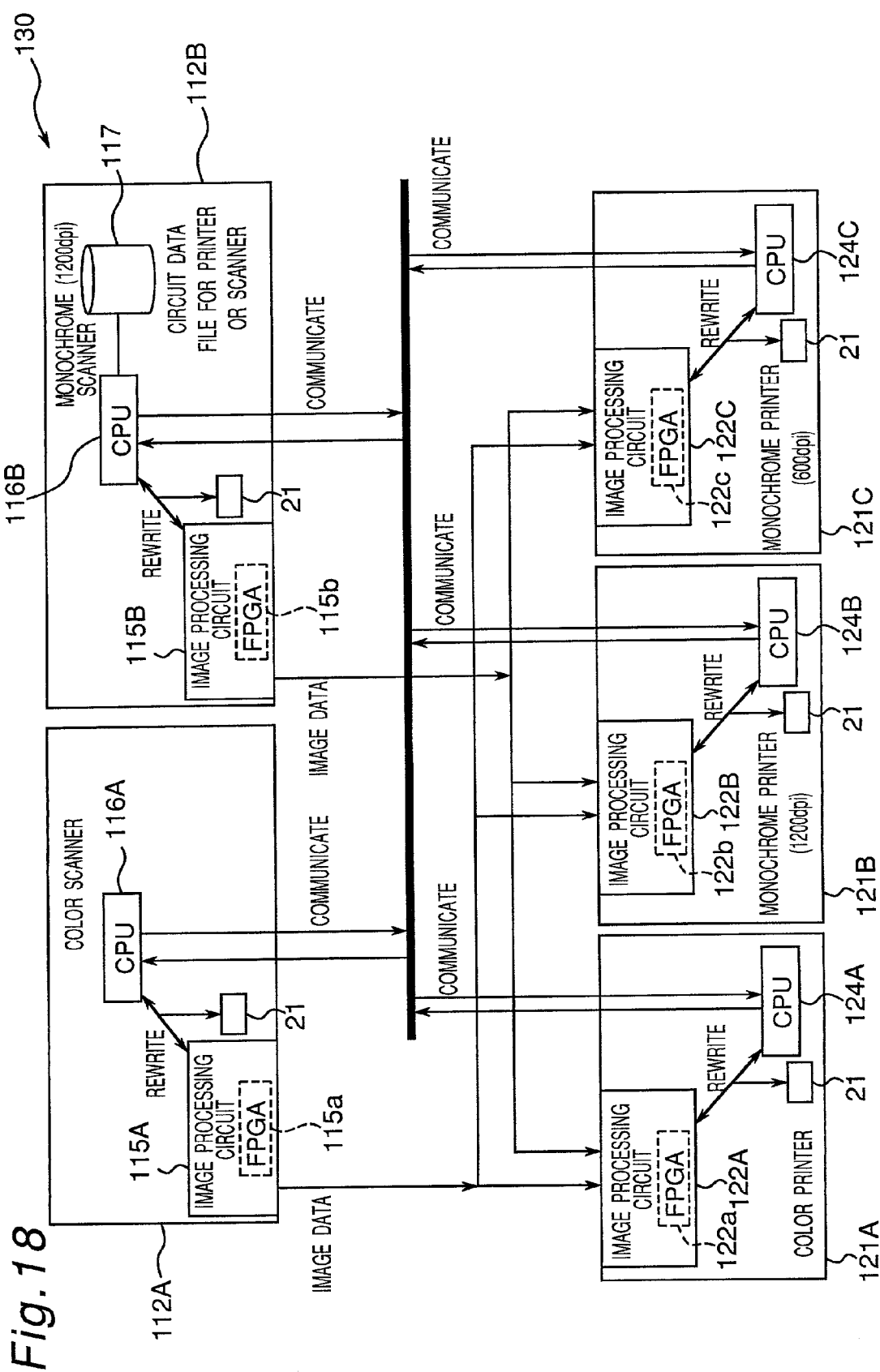

IMAGE PROCESSING SYSTEM FOR READING AND PROCESSING IMAGES

This application is based on applications Nos. 11-341815, 11-341816, 11-341817 and 11-341818 filed in Japan, the contents of which is hereby incorporated by reference.

BACKGROUND OF THE INVENTION

The present invention relates to an image processing system including an image reading device and a printing device that are respectively incorporated with image processing systems for processing image data according to specified specifications.

Accompanying recent progresses in information processing techniques, various image processing devices are being commercially available from many manufacturers and all kinds of image processing devices came into general use in these days. Well-known examples of such image processing devices are scanners for optically reading original documents and converting these into electronic image data or printers for printing received image data on recording media. Such scanners and printers are generally used in that they are individually connected to personal computers or in that they are connected to each other wherein image data are transmitted between both appliances through the personal computer in the former case while image data are directly transmitted in the latter case.

Particularly in the latter case in which a scanner and a printer are connected to each other to comprise an image processing system for performing copying processes, it is generally the case that specified image processing circuits are respectively incorporated into each of the appliances and image are being transmitted between both appliances while being processed in the image processing circuits of each of the appliances.

In connection therewith, one example of a conventional image processing system wherein an image reading device and a printer device are connected for performing copying processes is illustrated in FIG. 19. In this image processing system 150, copying processes are performed in which respective CPUs 156, 164 are communicating with each other with an image reading device (hereinafter referred to as "scanner") 153 and a printing device (hereinafter referred to as "printer") 161 being directly connected. In performing such copying processes, an original document is first read by a CCD 154 in the scanner 153 and the acquired image data is processed in an image processing circuit 155 whereupon the image data is output to the printer 161. The output image data is received by the printer 161 and further processed in an image processing circuit 162 thereof, and is finally developed and printed on paper by using a laser (indicated by LD in the drawing) 163.

In such an image processing system 150, it is generally the case that respective devices, that is, the scanner 153 and the printer 161, are provided on the basis of individual specifications related to resolution, colored/monochrome, and number of halftones, and image data are being processed in respective devices according to these specifications. At this time, image data are being sequentially processed in the image processing circuits 155, 162 of respective devices, while it is necessary to performing processing of image data in both image processing circuits 155, 162 on the basis of identical specifications in order to obtain copies of desired qualities.

It is therefore the case that the conventional image processing system 150 is comprised of a scanner 153 and a printer 161 that are of identical specifications. More particularly, such a conventional scanner and printer lack in compatibility with other appliances to be connected, and in case the user buys a new printer that is of different specification, it may require the user to also buy a new scanner that is of identical specification therewith. This was a factor for increasing the burden on the user in view of costs.

To deal with such problems in such a conventional arrangement, it would be possible to preliminarily integrate various image processing circuits to correspond to all kinds of combinations and to switch among these for enabling connection of devices that are of different specifications also in the conventional arrangement. However, the necessity of providing a plurality of image processing circuits increases the scale of the circuits and may lead to increased costs. Another drawback was it that it was impossible to deal with new devices that are of different specifications.

In view of this fact, let us consider an image processing system for performing copying processes that is comprised by connecting a scanning device and printing device that are of mutually different specifications. In such an image processing system, at least either of the scanning device or the printing device is incorporated with an image processing circuit a part of which includes systematically aligned programmable logic modules with wiring regions provided therebetween such that a device realizing a desired logic is used by connecting the logic modules and the wiring regions in accordance with a specified program. Such an image processing circuit may be set in accordance with specifications for processing image data on the basis of given circuit arrangement information, and copying processes may be performed by mutually connecting a scanning device and a printing device that are of different specifications by setting the above image processing circuit to run on specifications for processing that are identical to the image processing circuit of the other device in accordance with the information on specifications thereof.

In the above-described image processing system, upon changing a device that is connected to a device that is incorporated with an image processing circuit that may be set depending on specifications for processing image data on the basis of given circuit arrangement information, circuit arrangement information corresponding to specification information of the new device are transferred to the image processing circuit. Thus, even if the required specifications are equal to the former ones, it will be required to transfer the same circuit arrangement information as the former one to the image processing circuit. The image processing circuit will then set a circuit that is identical to the former one based on the repeatedly transferred circuit arrangement information. In other words, both, a time for transferring circuit arrangement information and a time for setting a circuit based on the circuit arrangement information will be required in such a case so that boot times for the devices will become long similar to a case in which different specifications are required before and after changing the opposing device.

It is, in general, further the case that a volatile device is used as the image processing circuit that may be set in accordance with specifications for processing image data in the above-described image processing system, and specifications for processing image data that have been set in the image processing circuit on the basis of specified circuit arrangement information will become invalid without being maintained when the power source is switched OFF. Therefore, it will be necessary to transfer circuit arrangement information that is identical to the former one to the image processing circuit also in case the required specifications are identical to those of the former upon switching the power source ON again. The image processing circuit will then set a circuit that is identical to the former one based on the repeatedly transferred circuit arrangement information. In other words, both, a time for transferring circuit arrangement information and a time for setting a circuit based on the circuit arrangement information will be required in such a case so that boot times for the devices will become long similar to a case in which different specifications are required before and after switching the power source ON.

Still further, in case specifications for the image processing circuit of, for instance, the scanning device is to be set in accordance with information on specifications of the printing device in the above-described image processing system, the device that is incorporated with an image processing circuit that may be set in accordance with specifications for processing image data on the basis of given circuit arrangement information needs to correspond to a plurality of devices that are incorporated with image processing circuits that are of mutually different specifications such that image data may be sent from the plurality of printing devices to a single scanning device. In this case, a time required for performing setting will be prolonged as a whole when employing an arrangement in which setting of specifications are performed on the side of the device that is incorporated with an image processing circuit that may be set in accordance with specifications for processing image data each time switching of destinations for sending image data to is performed.

It is therefore an object of the present invention to provide an image processing system in which devices, which are of different specifications in view of, for instance, resolution, colored/monochrome or number of halftones, may be connected for enabling copying processes.

It is another object of the present invention to provide an image processing system with which an average boot time of a device may be shortened when changing a device that is connected to a device that is incorporated with an image processing circuit that may be set in accordance with specifications for processing image data.

It is still another object of the present invention to provide an image processing system with which a boot time at the time of switching a power source ON may be shortened.

It is still another object of the present invention to provide an image processing system comprised of a plurality of scanning devices and printing devices with which boot times for the devices may be shortened in performing switching among devices to be used.

SUMMARY OF THE INVENTION

In one aspect of the present invention, there is provided an image processing system comprised of an image reading device for optically reading original documents and converting these into electronic image data, and a printing device for printing image data that have been received from the image reading device onto recording media, wherein the image processing system includes a first image processing unit that is provided on the image reading device side for processing read image data with at least a part thereof being comprised by a device which circuit logic is variable; a second image processing unit that is provided on the printing device side for processing image data received from the image reading device; a recording medium for storing a plurality of circuit arrangement information; and a control unit for discriminating specifications for processing of the second image processing unit, selecting one of the plurality of circuit arrangement information in accordance with the discriminated specifications for processing, and setting a circuit logic for the first image processing unit based on the selected circuit arrangement information.

The specifications for processing that are discriminated by the control unit are preferably specifications for processing related to at least one of resolution, colored/monochrome and number of halftones. It is alternatively possible to employ an arrangement in which the recording medium is provided on the printing device side and in which the control unit acquires circuit arrangement information that is stored in the recording medium upon communication with the printing device. It is also possible to employ an arrangement in which the image processing system is further comprised with another image reading device that may communicate with the above-described image reading device and in which the control unit acquires circuit arrangement information that is stored in the recording medium upon communication with the other image reading device. It is further possible to employ an arrangement in which the image processing system is further comprised with a non-volatile memory provided on the image reading device side, and in which the control unit performs control such that circuit arrangement information acquired from the recording medium are stored in the non-volatile memory and that these circuit information are read from the non-volatile memory when necessary for setting the circuit logic for the first image processing unit. It is also possible to employ an arrangement in which the control unit reads circuit information from the non-volatile memory when switching the power source of the device ON for setting the circuit logic for the first image processing unit. It is also possible to employ an arrangement in which the control unit compares the newly acquired circuit arrangement information with circuit arrangement information that is in compliance with the currently set circuit logic for the first image processing unit and inhibits setting of a circuit logic for the first image processing unit that is based on the newly acquired circuit arrangement information in case both information are identical. It is further possible to employ an arrangement in which the control unit sets the circuit logic for the first image processing unit to be a circuit logic that is based on default specifications in case a specified condition is met. It is also possible to employ an arrangement in which the control unit sets the circuit logic for the first image processing unit to be a circuit logic based on default specifications upon completion of a single job in case the specified condition is completion of a single job in the image processing system. It is also possible to employ an arrangement in which the control unit sets the circuit logic for the first image processing unit to be a circuit logic that is based on default specifications when a standby time of the image processing system has exceeded a specified time in case the specified condition is the standby time of the image processing system. The default specifications are preferably specifications for processing that are most frequently used.

In another aspect of the present invention, there is provided an image processing system comprised of an image reading device for optically reading original documents and converting these into electronic image data, and a printing device for printing image data that have been received from the image reading device onto recording media, wherein the image processing system includes a first image processing unit that is provided on the image reading device side for processing read image data; a second image processing unit that is provided on the printing device side for processing image data received from the image reading device with at least a part thereof being comprised by a device which circuit logic is variable; a recording medium for storing a plurality of circuit arrangement information; and a control unit for discriminating specifications for processing of the first image processing unit, selecting one of the plurality of circuit arrangement information in accordance with the discriminated specifications for processing, and setting a circuit logic for the second image processing unit based on the selected circuit arrangement information.

The specifications for processing that are discriminated by the control unit are preferably specifications for processing related to at least one of resolution, colored/monochrome and number of halftones. It is alternatively possible to employ an arrangement in which the recording medium is provided on the printing device side and in which the control unit acquires circuit arrangement information that is stored in the recording medium upon communication with the printing device. It is also possible to employ an arrangement in which the image processing system is further comprised with another image reading device that may communicate with the above-described image reading device and in which the control unit acquires circuit arrangement information that is stored in the recording medium upon communication with the other image reading device. It is further possible to employ an arrangement in which the image processing system is further comprised with a non-volatile memory provided on the image reading device side, and in which the control unit performs control such that circuit arrangement information acquired from the recording medium are stored in the non-volatile memory and that these circuit information are read from the non-volatile memory when necessary for setting the circuit logic for the second image processing unit. It is also possible to employ an arrangement in which the control unit reads circuit information from the non-volatile memory when switching the power source of the device ON for setting the circuit logic for the second image processing unit. It is also possible to employ an arrangement in which the control unit compares the newly acquired circuit arrangement information with circuit arrangement information that is in compliance with the currently set circuit logic for the second image processing unit and inhibits setting of a circuit logic for the second image processing unit based on the newly acquired circuit arrangement information in case both information are identical. It is further possible to employ an arrangement in which the control unit sets the circuit logic for the second image processing unit to be a circuit logic that is based on default specifications in case a specified condition is met. It is also possible to employ an arrangement in which the control unit sets the circuit logic for the second image processing unit to be a circuit logic that is based on default specifications upon completion of a single job in case the specified condition is completion of a single job in the image processing system. It is also possible to employ an arrangement in which the control unit sets the circuit logic for the second image processing unit to be a circuit logic that is based on default specifications when a standby time of the image processing system has exceeded a specified time in case the specified condition is the standby time of the image processing system. The default specifications are preferably specifications for processing that are most frequently used.

BRIEF EXPLANATIONS OF THE DRAWINGS

FIG. 4A illustrates image data output patterns of the scanner of the image processing system corresponding to a second printer.

FIG. 4B illustrates, in an enlarged form, a part of the image data output of the scanner of the image processing system corresponding to the second printer.

FIG. 5A illustrates image data output patterns of the scanner of the image processing system corresponding to a third printer.

FIG. 5B illustrates, in an enlarged form, a part of the image data output of the scanner of the image processing system corresponding to the third printer.

FIG. 9B is a flowchart illustrating processes for setting specifications of the image processing circuit on the basis of circuit data at the time of switching the power source of the image processing system ON.

FIG. 15 is an explanatory view illustrating an arrangement of a modified example of the image processing system according to the fourth form of embodiment.

FIG. 16 is an explanatory view illustrating an arrangement of the image processing system according to a fifth form for embodying the present invention.

FIG. 18 is an explanatory view illustrating an arrangement of a modified example of the image processing system according to the fifth form of embodiment.

DETAILED DESCRIPTIONS OF FORMS FOR EMBODYING THE PRESENT INVENTION

Forms for embodying the present invention will now be explained with reference to the accompanying drawings.

Embodiment 1

Figure 1:
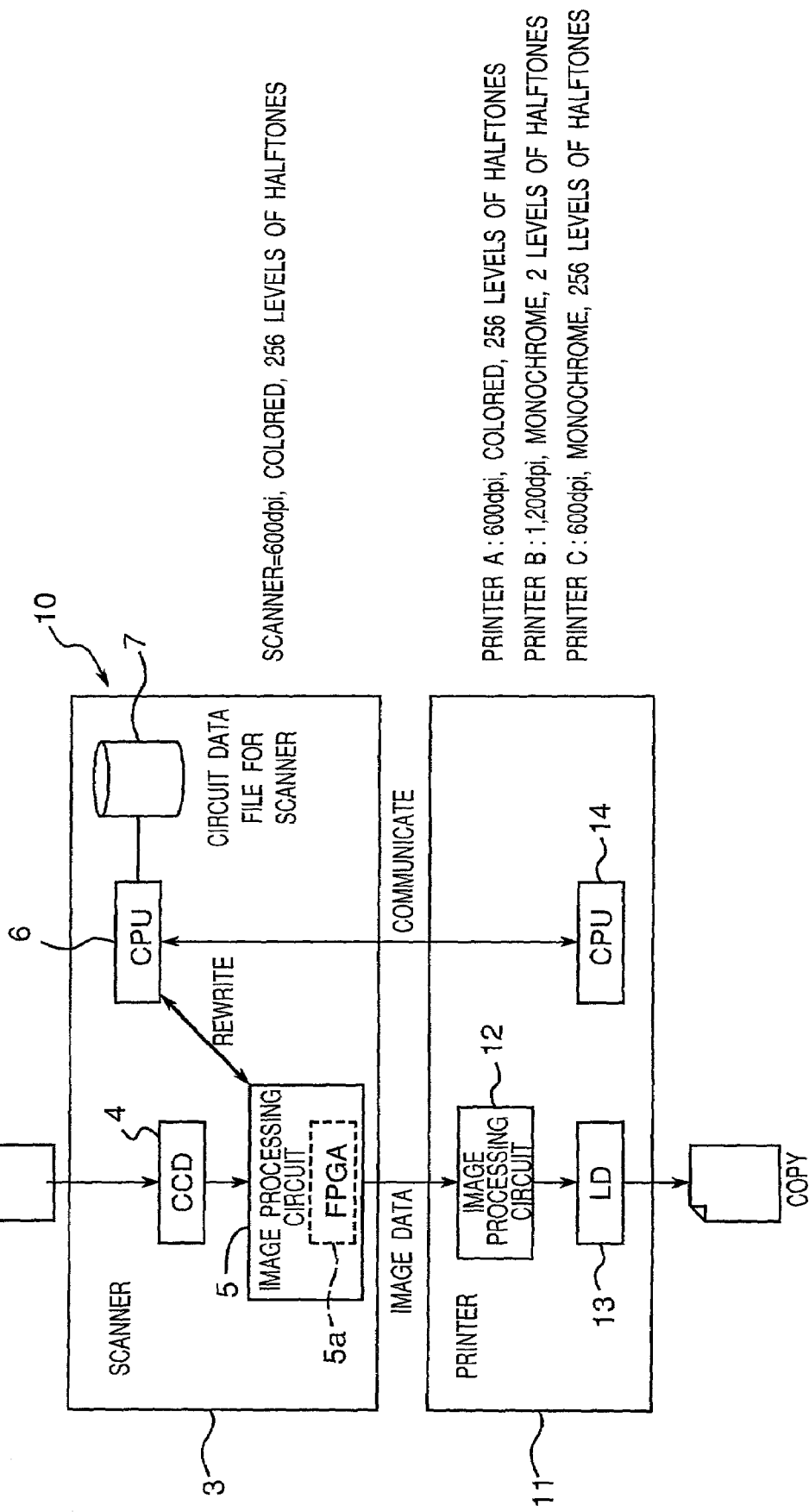
FIG. 1 is an explanatory view illustrating an arrangement of the image processing system according to a first form for embodying the present invention.

FIG. 1 illustrates an arrangement of the image processing system according to a first form for embodying the present invention. The image processing system 10 includes a scanner 3 for optically reading original documents and converting these into electronic image data, and a printer 11 for printing image data that have been received from the scanner 3 on recording media, wherein the scanner 3 and the printer 11 are mutually connected for performing copying processes by working together while sending and receiving various information to and from each other.

In a basic arrangement, the scanner 3 is comprised of a CCD 4 for reading original documents and converting these into electronic image data, an image processing circuit 5 that is provided proximate to an output side of the scanner 3 for outputting image data received from the CCD 4 upon processing, a CPU 6 for controlling operations of various portions within the scanner 3, and a circuit data file 7 for the scanner. On the other hand, the printer 11 is comprised of an image processing circuit 12 that is provided proximate to an input side thereof for processing image data received from the scanner 3, a laser 13 (indicated by LD in the drawing) for developing and printing the image data on paper, and a CPU 14 for controlling operations of various portions within the printer 11.

In performing copying processes between the scanner 3 and the printer 11, image data are directly supplied from the image processing circuit 5 on the scanner 3 side to the image processing circuit 12 on the printer 11 side, and mutual communication is performed between the CPU 6 on the scanner 3 side and the CPU 14 on the printer 11 side for identifying types or operating conditions of the opposing appliances as illustrated in FIG. 1. At this time, image data are processed in the image processing circuits 5 and 12 on the basis of specified specifications for processing images, e.g. resolution, colored/monochrome and number of halftones, and for enabling sequential processing of image data in the image processing circuits 5 and 12, data are required to be processed on the basis of identical specifications in the image processing circuits 5 and 12.

To meet this requirement, the image processing circuit 5 that is incorporated within the scanner 3 of the above image processing system 10 is one that may be set in accordance with specifications for processing image data on the basis of given circuit arrangement information. In this illustrated embodiment, a conventionally known gate array 5a (so-called FPGA (Field Programmable Gate Array)) which circuit logic is rewritable is used to comprise a part of the image processing circuit. Note that detailed descriptions related to circuit arrangements or the like will be omitted here since the FPGA itself is a conventionally known technique. Using the FPGA 5a, it is possible to realize a desired logic by systematically aligning programmable logic modules with wiring regions provided therebetween to thus connect the logic modules and the wiring regions in accordance with a specified program. It is accordingly enabled to change the circuit logic and to perform processing of image data in accordance with various specifications on the basis of various given programs.

According to the illustrated embodiment, the scanner 3 is further provided with the circuit data file 7 for storing a plurality of setting information for establishing a circuit logic for the image processing circuit 5, that is, circuit arrangement information (hereinafter referred to as "circuit data") therein. The circuit data file 7 is stored in a recording medium such as a hard disk. This recording medium further stores therein a rewriting program for writing circuit data to the image processing circuit 5, that is, for rewriting circuit data.

In the thus arranged image processing system 10, specifications for the image processing circuit 5 on the scanner side 3 are set as follows in performing copying processes.

Figure 2:
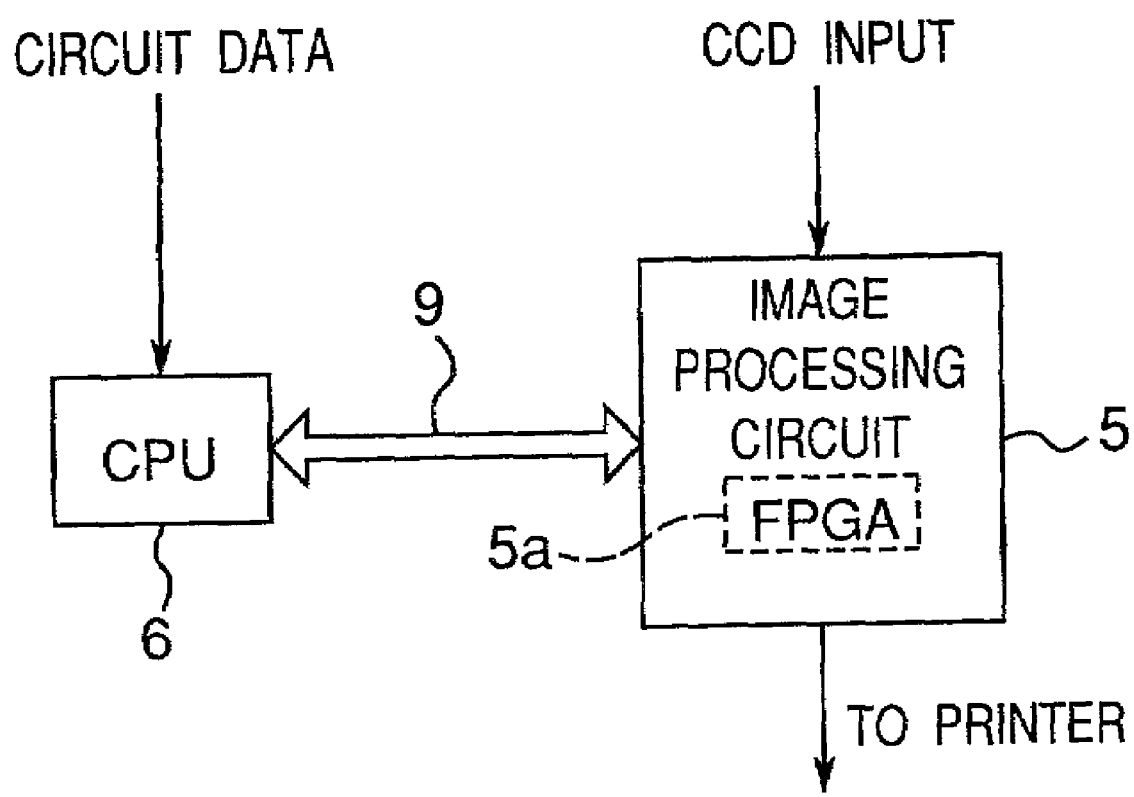
FIG. 2 is an explanatory view wherein circuit data are transmitted to an image processing circuit (FPGA) provided within a scanner of the above image processing system.

In a condition in which the scanner 3 and the printer 11 are mutually connected, communication is performed between the CPU 6 and the CPU 14 that are incorporated in both members. Upon communication, the CPU 6 identifies a specification that is being employed by the image processing circuit 12 on the printer 11 side. The CPU 6 then selects circuit data corresponding to the identified specifications from among the circuit data file 7 in accordance with a rewriting program and these circuit data are written into the FPGA 5a of the image processing circuit 5. With this arrangement, the circuit data of the FPGA 5a are rewritten and the circuit logic thereof is changed. On the other hand, circuit data corresponding to these specifications are selected in the scanner 3 from the circuit data file 7 and sent to the image processing circuit 5 through the CPU 6. As illustrated in FIG. 2, the CPU 6 and the image processing circuit 5 are mutually connected via a CPU bus 9 so that circuit data that have been selected from among the circuit data file 7 are sent to the image processing circuit 5 through the CPU bus 9 upon passing through the CPU 6.

In the image processing circuit 5, the circuit data that have been selected by the CPU 6 in accordance with the specifications of the printer 11 side are written to the FPGA 5a and specifications thereof are accordingly set. With this arrangement, the image processing circuit 5 is enabled to process image data based on specifications that are identical to the specifications of the image processing circuit 12 on the printer 12 side.

It will now be explained for specifications that are set in the image processing circuit 5 on the scanner 3 side and output patterns of image data that are output to the printer 11 side upon processing on the basis thereof in case printers 11 of various specifications (printer A, B and C) are connected to the scanner 3 comprised with the image processing circuit 5 that may be set in accordance with specifications for processing image data on the basis of given circuit data.

The original specifications for the scanner 3 are "600 D dpi, colored, 256 levels of halftones". The term "original specifications" indicates specifications of an initial condition that are set in the image processing system 5 in case the scanner 3 has, for instance, been reset. On the other hand, specifications of the printers A, B and C are "600 dpi, colored, 256 levels of halftones", "1,200 dpi, monochrome, 2 levels of halftones" and "600 dpi, monochrome, 256 levels of halftones", respectively.

First, in case the printer A is connected and it is determined by the CPU 6 that the specifications of the printer 11 side is "600 dpi, colored, 256 levels of halftones", circuit data corresponding to these specifications of the printer 11 side are selected in the scanner 3 from among the circuit data file 7, and these circuit data are sent to the image processing circuit 5 by passing through the CPU 6. Based on these circuit data, the specifications of the image processing circuit 5 are set to generate image data of "600 dpi, colored, 256 levels of halftones". It should be noted that since the specifications of the printer 11 side are identical to the original specifications of the scanner 3 side, the process of resetting specifications for the image processing circuit 5 based on the circuit data selected from the circuit data file 7 may be omitted to perform processing on the basis of original specifications.

In this manner, the image processing circuit 5 on the scanner 3 side will generate image data of "600 dpi, colored, 256 levels of halftones" using data of 600 dpi and respective colors of RGB that are output from the CCD 4. In the illustrated embodiment, RGB color data from the CCD 4 are converted into CMYK colors that are standard color modes for printing in generating such image data.

Figure 3A:
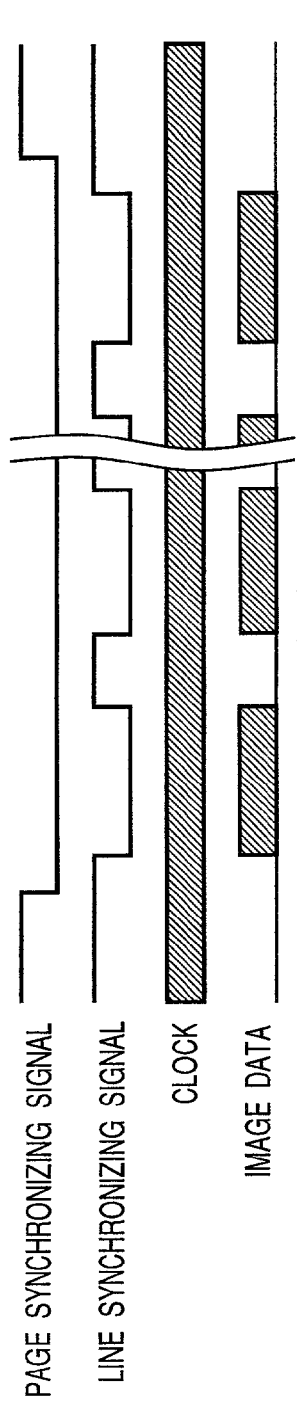
FIG. 3A illustrates image data output patterns of the scanner of the image processing system corresponding to a first printer.
Figure 3B:
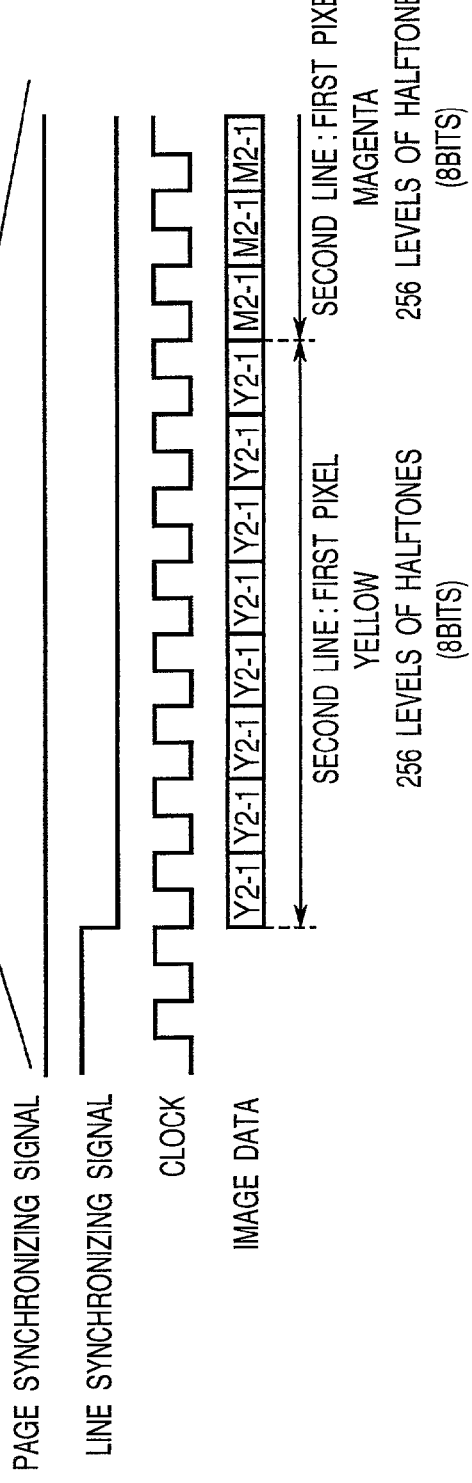
FIG. 3B illustrates, in an enlarged form, a part of the image data output of the scanner of the image processing system corresponding to the first printer.

Image data that have been generated in the image processing circuit 5 on the scanner 3 side are sequentially output to the printer 11 through an image data line. At this time, image data of CMYK colors and 256 levels of halftones are transferred per each pixel synchronously with page synchronizing signals/line synchronizing signals/clock signals as illustrated in FIG. 3. FIG. 3A illustrates timings for transferring image data for a single page and FIG. 3B illustrates these transfer timings for each line in an enlarged manner.

As illustrated in FIG. 3A, the page synchronizing signals are maintained at a low level while transferring data for a single page, and line synchronizing signals are maintained at a low level for each line of the single page. As it is evident from FIG. 3B, respective color data of Y (yellow), M (magenta), C (cyan) and K (black) are sequentially transferred by each 8 bits per pixels synchronously with the above-described two signals and the clock signals as image data of CMYK colors and 256 levels of halftones. When the page synchronizing signals and line synchronizing signals are of low level and the clock signals are of high level, the image data are acquired by the printer 11 as valid data. It should be noted that "Y2-1" in FIG. 3B indicates yellow, second line, first pixel and "M2-1" magenta, second line, first pixel.

Next, in case printer B is connected and it is determined by the CPU 6 that the specifications of the printer 11 side is "1,200 dpi, monochrome, 2 levels of halftones", circuit data corresponding to these specifications of the printer 11 side are selected in the scanner 3 from among the circuit data file 7, and these circuit data are sent to the image processing circuit 5 by passing through the CPU 6. Based on these circuit data, a circuit for determining the resolution, colored/monochrome and number of halftones is adjusted such that the specifications are set to generate image data of "1,200 dpi, monochrome, 2 levels of halftones". In this manner, the image processing circuit 5 may output image data of "1,200 dpi, monochrome, 2 levels of halftones" by using respective data of 600 dpi and RGB colors that are output from the CCD 4.

Image data that have been generated in the image processing circuit 5 on the scanner 3 side are sequentially output to the printer 11 through the image data line. At this time, monochrome image data of 2 levels of halftones are transferred per each pixel synchronously with page synchronizing signals/line synchronizing signals/clock signals as illustrated in FIG. 4. FIG. 4A illustrates timings for transferring image data for a single page and FIG. 4B illustrates these transfer timings for each line in an enlarged manner.

As illustrated in FIG. 4A, the page synchronizing signals are maintained at a low level while transferring data for a single page, and line synchronizing signals are maintained at a low level for each line of the single page. As it is evident from FIG. 4B, data of K (black) are transferred by each bit per each pixel synchronously with the above-described two signals and the clock signals as monochrome image data of 2 levels of halftones. When the page synchronizing signals and line synchronizing signals are of low level and the clock signals are of high level, the image data are acquired by the printer 11 as valid data. It should be noted that "K2-1" in FIG. 4B indicates black, second line, first pixel.

Thereafter, in case the printer C is connected and it is determined by the CPU 6 that the specifications of the printer 11 side is "600 dpi, monochrome, 256 levels of halftones", circuit data corresponding to these specifications of the printer 11 side are selected in the scanner 3 from among the circuit data file 7, and these circuit data are sent to the image processing circuit 5 by passing through the CPU 6. Based on these circuit data, the specifications of the image processing circuit 5 are set to generate image data of "600 dpi, monochrome, 256 levels of halftones", and image data of "600 dpi, monochrome, 256 levels of halftones" are output by using respective data of 600 dpi and RGB colors that are output from the CCD 4.

Image data that have been generated in the image processing circuit 5 on the scanner 3 side are sequentially output to the printer 11 through the image data line. At this time, monochrome image data of 256 levels of halftones are transferred per each pixel synchronously with page synchronizing signals/line synchronizing signals/clock signals as illustrated in FIG. 5. FIG. 5A illustrates timings for transferring image data for a single page and FIG. 5B illustrates these transfer timings for each line in an enlarged manner.

As illustrated in FIG. 5A, the page synchronizing signals are maintained at a low level while transferring data for a single page, and line synchronizing signals are maintained at a low level for each line of the single page. As it can be more particularly understood from FIG. 5B, data of K (black) are transferred by each 8 bits per pixels synchronously with the above-described two signals and the clock signals as monochrome image data of 256 levels of halftones. When the page synchronizing signals and line synchronizing signals are of low level and the clock signals are of high level, the image data are acquired by the printer 11 as valid data.

While not particularly illustrated in the drawings, image processing circuits 5 provided on scanner 2 side will be similarly set in accordance with various specifications of printers 11 to be connected in case the original specifications of the scanner 2 are, for instance, "1,200 dpi, monochrome, 2 levels of halftones" and "600 dpi, monochrome, 256 levels of halftones".

In case of employing a scanner 2 which original specifications are "1,200 dpi, monochrome, 2 levels of halftones" and the specifications of the printer 11 are "600 dpi, colored, 256 levels of halftones", the specifications of the image processing circuit 5 on the scanner 2 side are set to generate image data of 600 dpi, color K (black) and 256 levels of halftones using monochrome data of 1,200 dpi that are output from the CCD 4. It should be noted that data 0 are transferred in view of CMY colors in transferring image data to the printer 11.

In case the specifications of the printer 11 are "1,200 dpi, monochrome, 2 levels of halftones", the specifications of the image processing circuit 5 on the scanner 2 side are set to generate image data of 1,200 dpi, color K (black) and 2 levels of halftones using monochrome data of 1,200 dpi that are output from the CCD 4.

Still further, in case the specifications of the printer 11 are "600 dpi, monochrome, 256 levels of halftones", the specifications of the image processing circuit 5 on the scanner 2 side are set to generate image data of 600 dpi, color K (black) and 256 levels of halftones using monochrome data of 1,200 dpi that are output from the CCD 4.

In case of employing a scanner 2 which original specifications are "600 dpi, monochrome, 256 levels of halftones" and the specifications of the printer 11 are "600 dpi, colored, 256 levels of halftones", the specifications of the image processing circuit 5 on the scanner 2 side are set to generate image data of 600 dpi, color K (black) and 256 levels of halftones using monochrome data of 600 dpi that are output from the CCD 4. It should be noted that data 0 are transferred in view of CMY colors in transferring image data to the printer 11.

In case the specifications of the printer 11 are "1,200 dpi, monochrome, 2 levels of halftones", the specifications of the image processing circuit 5 on the scanner 2 side are set to generate image data of 600 dpi, color K (black) and 2 levels of halftones using monochrome data of 600 dpi that are output from the CCD 4.

Still further, in case the specifications of the printer 11 are "600 dpi, monochrome, 256 levels of halftones", the specifications of the image processing circuit 5 on the scanner 2 side are set to generate image data of 600 dpi, color K (black) and 2 levels of halftones using monochrome data of 600 dpi that are output from the CCD 4.

As described above, by setting specifications for the image processing circuit 5 on the scanner 2 side based on circuit data selected from the circuit data file 7 in accordance with specification information of the image processing circuit 12 provided on the printer 11 side such that the specifications are identical to the specification information in performing copying processes by using the above image processing system 10, it will be possible to perform copying processes by mutually connecting scanner 2 and printer 11 which specifications in view of resolution, colored/monochrome and number of halftones differ.

In this case, it will not be required to provide a plurality of image processing circuits in accordance with types of printers 11 so that it is possible to increase the circuit scale and to restrict increases in costs related therewith. The image processing system 10 is further capable of corresponding to new appliances by performing rewriting and/or additions of circuit data that are stored in the circuit data file 7.

Setting of specifications of the image processing circuit 5 is naturally performed in the image processing system 10 upon switching the power source of the scanner 3 or the printer 11 ON or upon changing the printer 11 that is connected to the scanner 3. When, for instance, changing the printer 11, and a new printer 11 is connected to the scanner 3, specification information of the image processing circuit 12 on the printer 11 side are instantly identified and circuit data corresponding to the specification information are selected from the circuit data file 7 and sent to the CPU 6 on the scanner 3 side. In the illustrated embodiment, circuit data corresponding to specification information corresponding to the new printer 11, and circuit data corresponding to specification information corresponding to the old printer 11, that is, circuit data used for the previous setting of specifications for the image processing circuit 5 on the scanner 3 side are compared in the CPU 6 on the scanner 3 side. In case it is found that these circuit data are identical, setting of specifications is not repeatedly performed for the image processing circuit 5.

It should be noted that the power source of the scanner 3 is maintained in an ON condition while changing the printer 11 and specifications that are set in the image processing circuit 5 are maintained.

Figure 6:
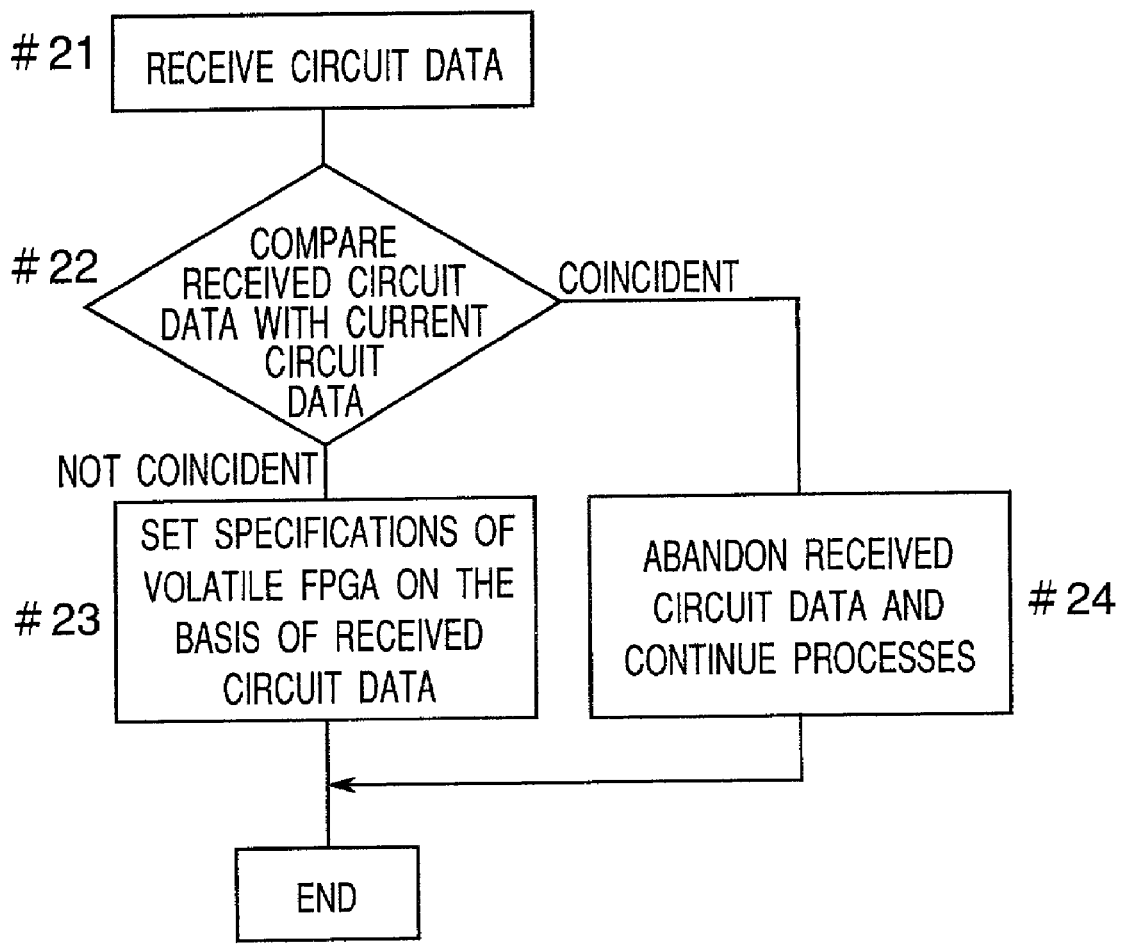
FIG. 6 is a flowchart illustrating processes for comparing circuit data in the scanner.

FIG. 6 is a flowchart illustrating processes for setting specifications for the image processing circuit when changing the printer 11 in the above image processing system 10.

Upon connecting a new printer 11, specification information thereof are first identified, and circuit data corresponding to the specification information are sent from the circuit data file 7 to the CPU 6 and received (#21). The CPU 6 then compares the newly received circuit data and circuit data that have been used for the previous setting of specifications for the image processing circuit 5 on the scanner 3 side (#22). In case it is accordingly found that both data are not coincident, the newly received circuit data are sent to the image processing circuit 5 and setting of the image processing circuit 5 is performed in accordance with specifications for processing image data on the basis of the circuit data (#23). In case both data are coincident in #22, the newly received circuit data are abandoned and processes are continued (#24).

By employing an arrangement in which setting of specifications for the image processing circuit 5 of the scanner 3 is not repeatedly performed in case it is determined that specifications of a new printer 11 are identical to specifications of the former printer in changing printers 11 in the above image processing system 10, it is possible to shorten the time for setting specifications required when changing to a new printer 11, that is, the time in which the devices are terminated.

Figure 7:
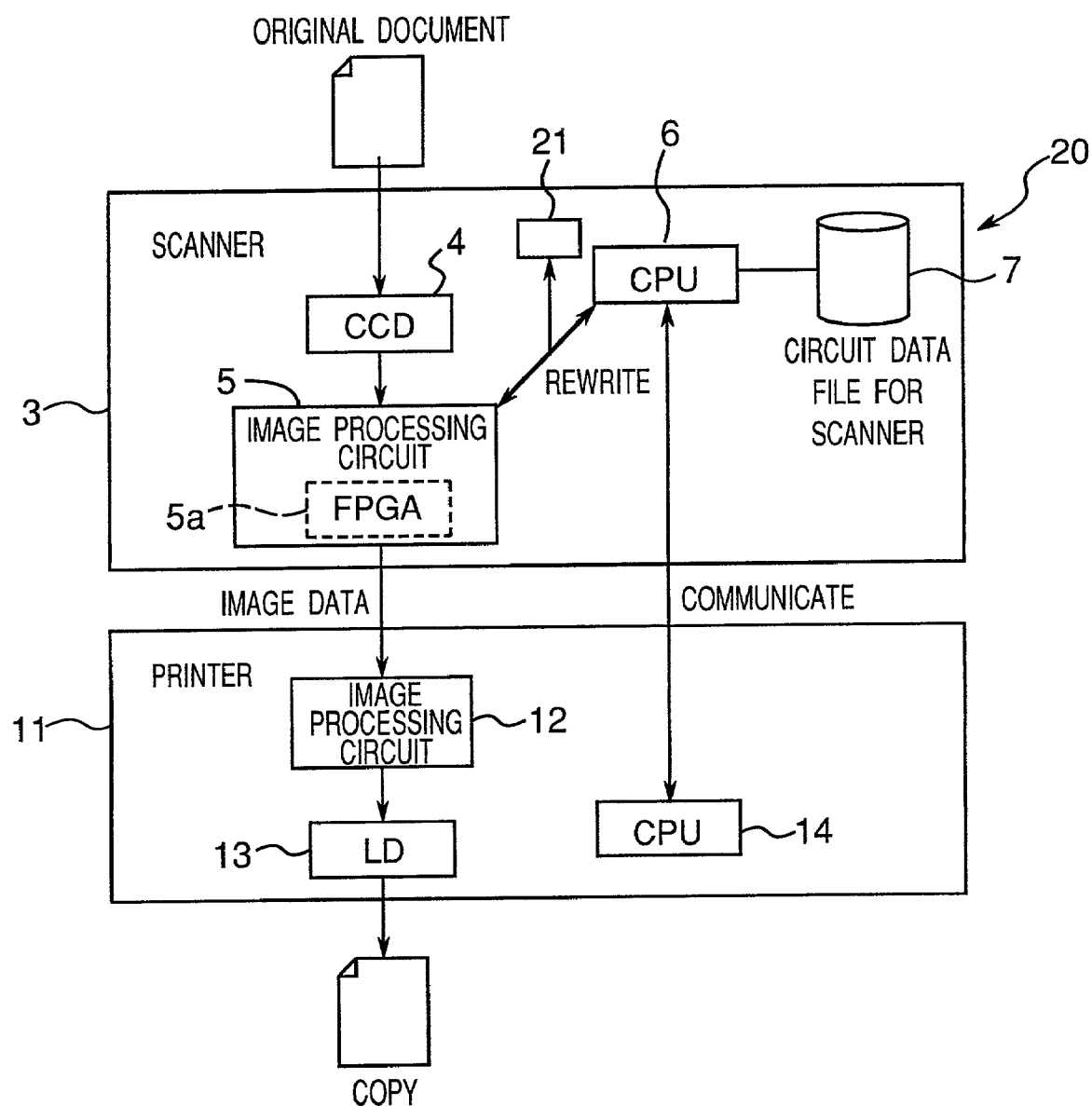
FIG. 7 is an explanatory view showing an arrangement of a modified example of the image processing system according to the first form for embodying the present invention.
Figure 8:
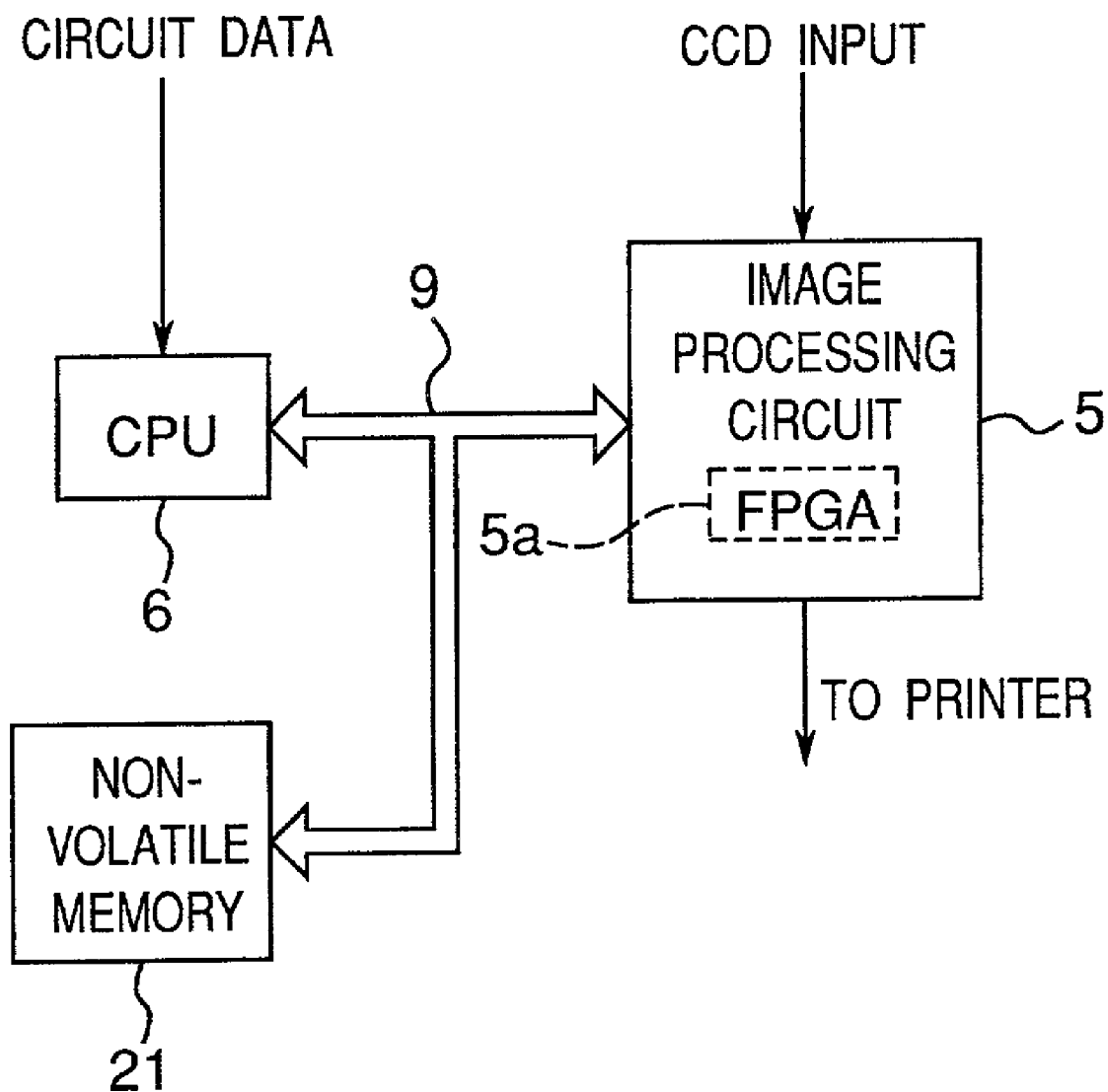
FIG. 8 is an explanatory view wherein circuit data are transmitted to an image processing circuit (FPGA) provided within a scanner of the above image processing system.

Since the image processing circuit 5 is a volatile one that may be set in accordance with specifications for processing image data, specifications for processing image data that have been set in the image processing circuit 5 on the basis of specified circuit data will become invalid without being maintained when switching the power source OFF. Thus, the above image processing system 10 is arranged in that circuit data corresponding to specification information of the printer 11 are repeatedly transferred to the image processing circuit 5 each time the power source of the scanner 3 is switched ON. While it will be generally necessary to transfer circuit data to the image processing circuit 5 that are identical to those of the previous time when switching the power source ON also in case the specifications that are currently required are identical to the previous specifications when employing the above style, it is alternatively possible to employ a non-volatile memory 21 in an image processing system 20 as illustrated in FIGS. 7 and 8 for communicating with the CPU 6 and the image processing unit 5 through the CPU bus 9 for simplifying transfer of circuit data in such cases. The non-volatile memory 21 is for storing circuit data when the circuit data are selected from the circuit data file 7 and are sent to the image processing circuit 5 through the CPU 6.

By the provision of such a non-volatile memory 21, circuit data that have been stored at the previous time of transfer may be directly supplied from the non-volatile memory 21 to the image processing circuit 5 when repeatedly switching the power source of the scanner 3 ON. It is consequently possible to eliminate the necessity of repeatedly selecting circuit data from the circuit data file 7 and transferring the circuit data through a specified communicating line, to eliminate the time for transferring circuit data and to thus shorten the boot times for the devices.

Figure 9A:
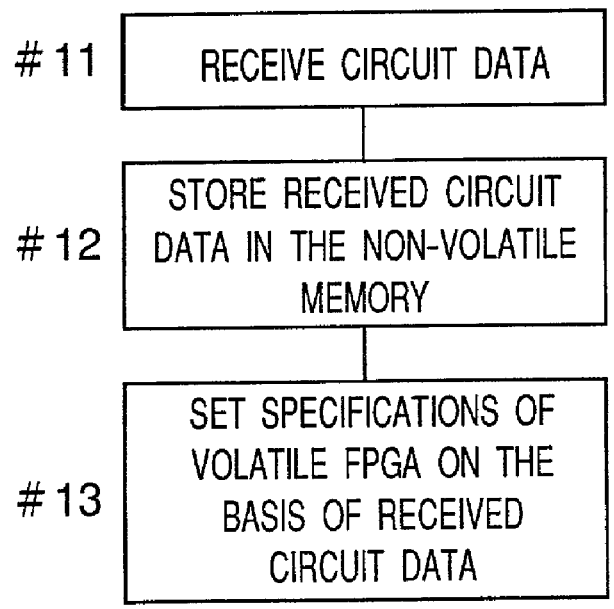
FIG. 9A is a flowchart illustrating processes for setting specifications of the image processing circuit based on circuit data at the time of transferring circuit data through a CPU of the image processing system.
Figure 9B:
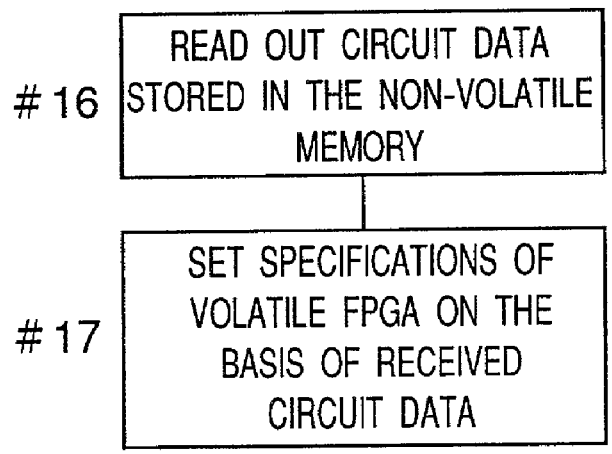

FIGS. 9A and 9B are flowcharts illustrating processes for setting specifications of the image processing circuit 5 based on circuit data at the time of transferring circuit data through the CPU 6 on the scanner 3 side and at the time of switching the power source ON, respectively.

As illustrated in FIG. 9A, the CPU 6 first receives circuit data that have been selected from the circuit data file 7 in transferring circuit data through the CPU 6 to the image processing circuit 5 (#31). Then, the received circuit data are sent from the CPU 6 to the non-volatile memory 21 and the non-volatile memory 21 stores the sent circuit data (#32). The CPU 6 sends the received circuit data to the image processing circuit 5 comprised with a volatile FPGA 5a so that specifications for processing image data on the basis of the circuit data are set in the image processing circuit 5 (#33). When switching the power source OFF, specifications that have been set in the image processing circuit 5 will become invalid while circuit data stored in the above non-volatile memory 21 will be maintained.

Next, in case specifications are requested that are identical to the previous specifications upon repeatedly switching the power source ON as illustrated in FIG. 9B, the circuit data stored in the non-volatile memory 21 are read out (#36). These circuit data are sent to the image processing circuit 5 and the image processing circuit 5 is set in accordance with specifications for processing image data on the basis of these circuit data (#37).

In this manner, by reading out circuit data that have been stored in the non-volatile memory 21 in case it is requested for specifications that are identical to the previous specifications upon switching the power source of the scanner 3 ON, it is possible to eliminate the necessity of repeatedly selecting desired circuit data from among the circuit data file 7 and to transfer the circuit data through the specified communicating line so that the time for transferring circuit data may be eliminated to thus shorten the boot time for the devices.

Another form for embodying the present invention will now be explained. It should be noted that members that are identical to those of the above-described first embodiment will be marked with the same reference numerals in the following descriptions, and further explanations thereof will be omitted.

Figure 10:
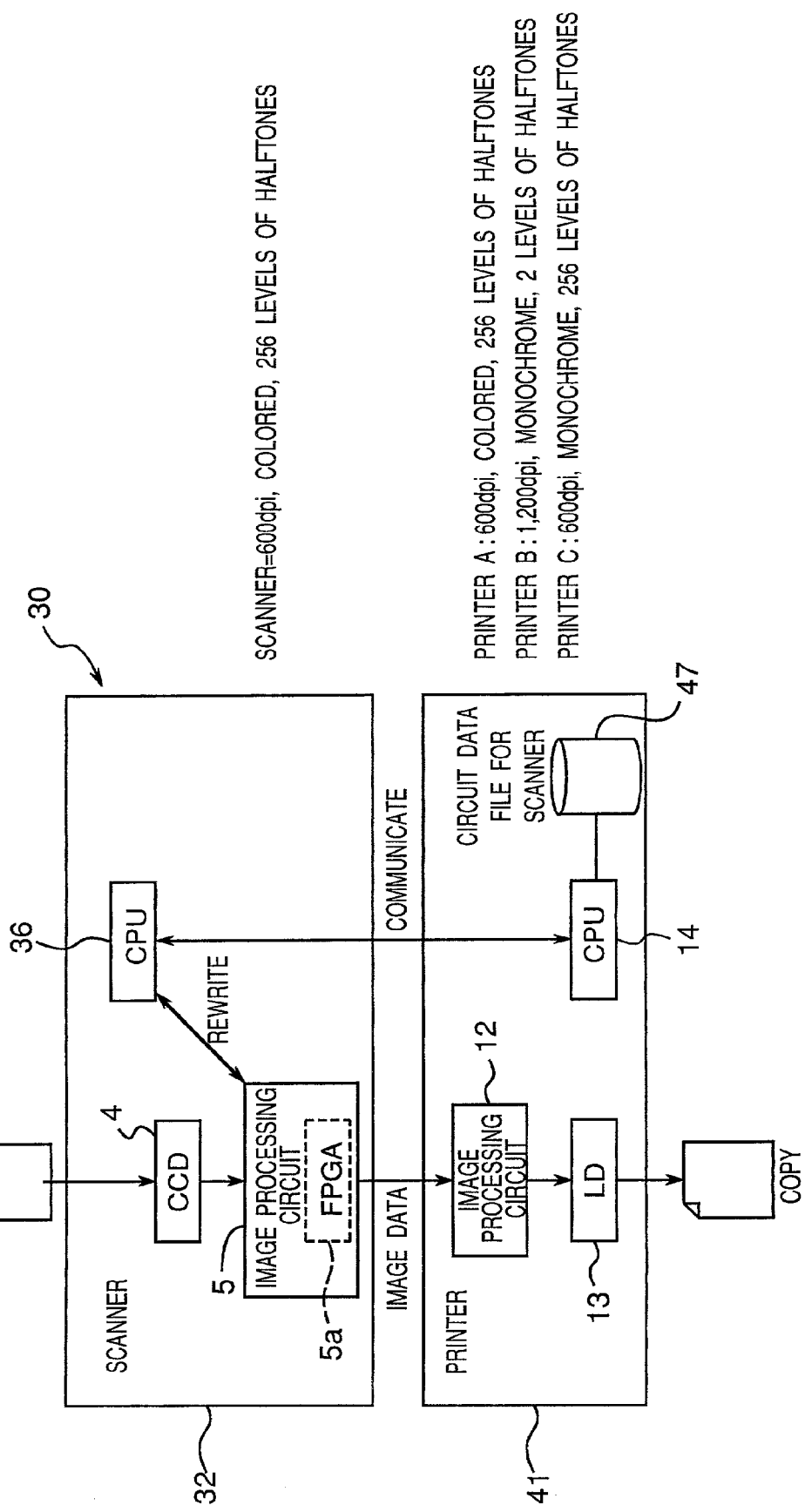
FIG. 10 is an explanatory view illustrating an arrangement of the image processing system according to a second form for embodying the present invention.

FIG. 10 is an explanatory view illustrating an arrangement of the image processing system according to a second form for embodying the present invention. The image processing system 30 is of similar arrangement as that of the above-described first embodiment while a circuit data file 47 for storing a plurality of circuit data that are provided to the image processing circuit 5 on a scanner 32 side is provided on a printer 41 side.

In the image processing system 30, specifications of the image processing circuit 5 on the scanner 32 side are set in the following manner for performing copying processes.

In a condition in which the scanner 32 and the printer 41 are mutually connected, communication is performed between CPU 36 and CPU 44 that are incorporated in these members for identifying specifications of the image processing circuit 12 on the printer 41 side, whereupon circuit data corresponding to these specifications are selected in the scanner 32 from among the circuit data file 47 that is provided within the printer 41. The selected circuit data are transferred to the image processing circuit 5 on the scanner 32 side through the CPU 44 on the printer 41 side and the CPU 36 on the scanner 32 side, whereupon the logic modules and wiring regions of the FPGA 5a are connected in the image processing circuit 5 on the basis of the circuit data that have been selected from the circuit data file 47 to thereby set the specifications. With this arrangement, the image processing circuit 5 may perform processing of image data in accordance with specifications that are identical to specifications that are employed in the image processing circuit 12 on the printer 41 side.

While setting of specifications of the image processing circuit 5 is naturally performed in the image processing system 30 upon switching the power source of the scanner 32 or the printer 41 ON or upon changing the printer 41 that is connected to the scanner 32, the second embodiment is arranged in that circuit data corresponding to specification information corresponding to the new printer 41 and circuit data corresponding to specification information corresponding to the old printer 41, that is, circuit data used for the previous setting of specifications for the image processing circuit 5 on the scanner 32 side are compared in the CPU 36 on the scanner 32 side. In case it is found that these circuit data are identical, the new circuit data are abandoned and processing of image data is continued on the basis of previous settings of specifications for the image processing circuit 5. In this manner, by employing an arrangement in which setting of specifications for the image processing circuit 5 of the scanner 32 is not repeatedly performed in case it is determined that specifications of a new printer 41 are identical to specifications of the former printer upon changing printers in the above image processing system 30, it is possible to shorten the time for setting specifications required when changing to a new printer 41, that is, the time in which the devices are terminated.

Figure 11:
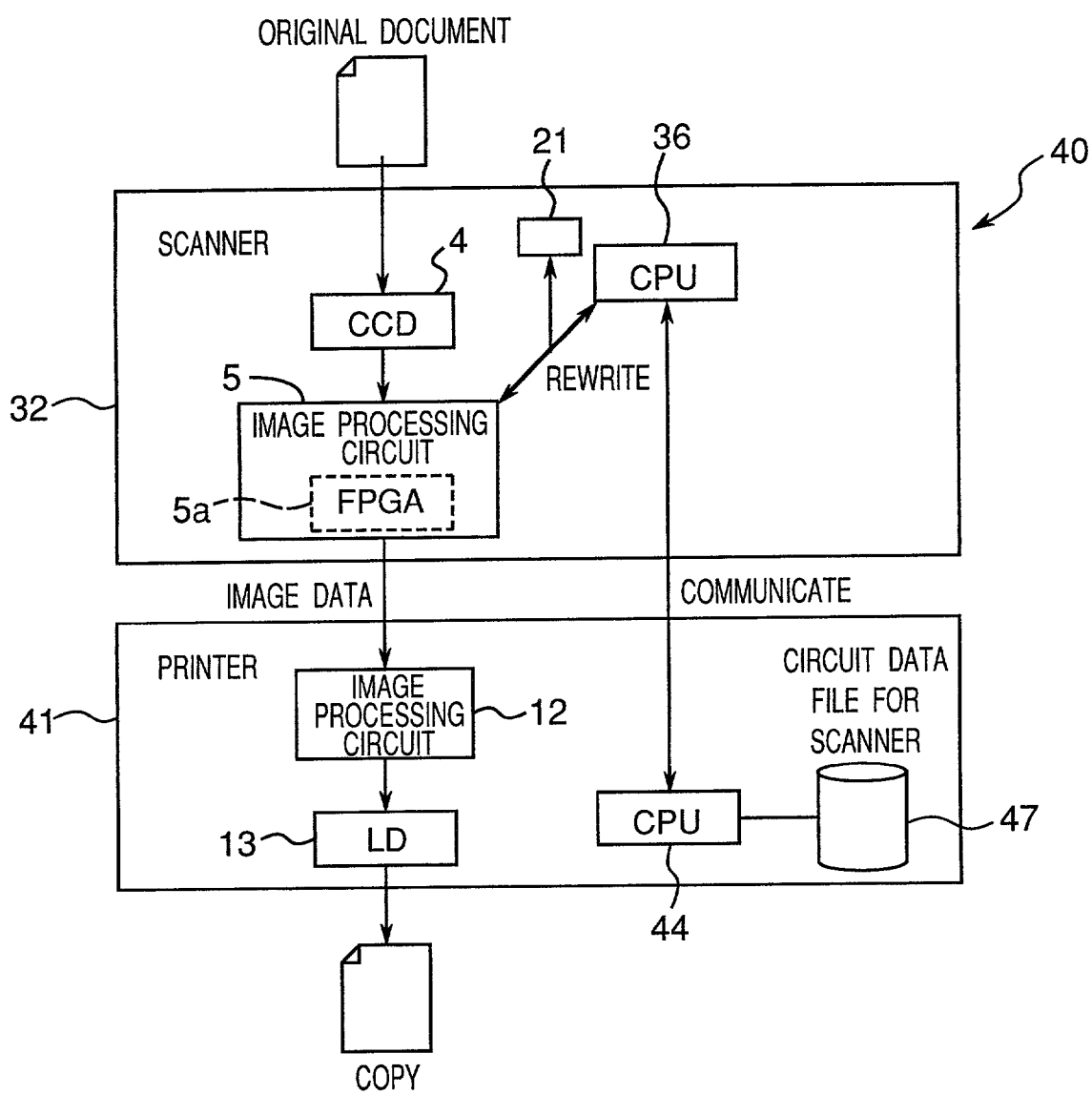
FIG. 11 is an explanatory view illustrating an arrangement of a modified example of the image processing system according to the second form of embodiment.

In an image processing system 40 as illustrated in FIG. 11, the non-volatile memory 21 for communicating with the CPU 36 and the image processing circuit 5 is provided on the scanner 32 side. In setting specifications for the image processing circuit 5, the image processing system 40 is arranged in that circuit data, which are selected from the circuit data file 47 to the image processing circuit 5 through the CPUs 47, 36, are stored in the non-volatile memory 21. With this arrangement, circuit data are maintained in the non-volatile memory 21 also after switching the power source of the scanner 32 OFF. In case the power source of the scanner 32 is repeatedly switched ON and specifications are requested that are identical those of the previous time, circuit data that have been stored at the previous time of transfer are directly supplied from the non-volatile memory 21 to the image processing circuit 5. It is consequently possible to eliminate the necessity of repeatedly selecting circuit data from the circuit data file 47 and transferring the circuit data through a specified communicating line, to eliminate the time for transferring circuit data and to thus shorten the boot times for the devices.

Figure 12:
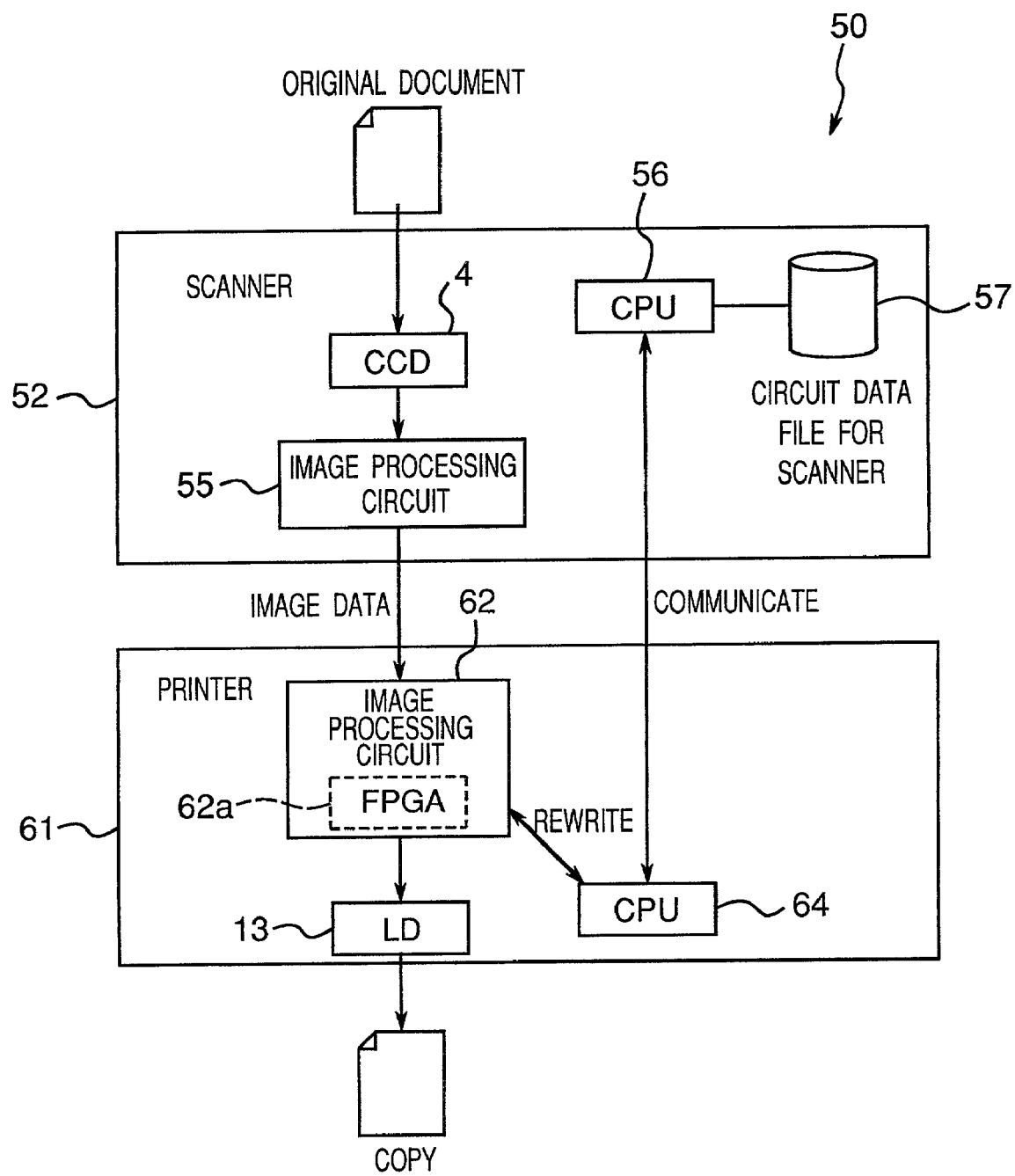
FIG. 12 is an explanatory view illustrating an arrangement of the image processing system according to a third form for embodying the present invention.

FIG. 12 is an explanatory view illustrating an arrangement of the image processing system according to a third form for embodying the present invention. In the above-described embodiments, the image processing circuit that may be set in accordance with specifications for processing image data on the basis of given circuit data had been incorporated on the scanner side. In the third embodiment, such an image processing circuit 62 is incorporated on a printer 61 side such that specifications for the image processing circuit 62 on the printer 61 side may be set in accordance with specifications of an image processing circuit 55 on a scanner 52 side.

In the image processing system 50, specifications for the image processing circuit 62 on the printer 61 side are set in the following manner in performing copying processes.

In a condition in which the scanner 52 and the printer 61 are mutually connected, communication is performed between CPU 56 and CPU 64 that are incorporated in these members for identifying specifications of the image processing circuit 55 on the scanner 52 side, whereupon circuit data corresponding to these specifications are selected in the printer 61 from among a circuit data file 57 that is provided within the scanner 52. The selected circuit data are transferred to the image processing circuit 62 on the printer 61 side through the CPU 56 on the scanner 52 side and the CPU 64 on the printer 61 side, whereupon the logic modules and wiring regions of FPGA 62a are connected on the basis of the circuit data that have been selected from the circuit data file 57 to thereby set the specifications. With this arrangement, the image processing circuit 62 may perform processing of image data in accordance with specifications that are identical to specifications that are employed in the image processing circuit 55 on the printer 52 side.

The image processing circuit 62 provided on printer 61 side will respectively be set as follows in accordance with various specifications of scanner 52 to be connected in case the original specifications of printer 61 are, for instance, "600 dpi, colored, 256 levels of halftones", "1,200 dpi, monochrome, 2 levels of halftones" and "600 dpi, monochrome, 256 levels of halftones", respectively.

In case of using a printer 61 which original specifications are "600 dpi, colored, 256 levels of halftones" and the specifications of the scanner 52 are "600 dpi, colored, 256 levels of halftones", the specifications of the image processing circuit 62 on the printer 61 side are set to similarly generate image data of "600 dpi, CMYK colors, 256 levels of halftones" by using image data of "600 dpi, CMYK colors, 256 levels of halftones" that are output from the scanner 52.

In case specifications for the scanner 52 are "1,200 dpi, monochrome, 2 levels of halftones", the specifications of the image processing circuit 62 on the printer 61 side are set to generate image data of "600 dpi, color K (black), 256 levels of halftones" by using image data of "1,200 dpi, color K (black), 2 levels of halftones" that are output from the scanner 52. It should be noted that data 0 are transferred in view of CMY colors in generating image data in the image processing circuit 62 on the printer 61 side in this case.

Further, in case specifications for the scanner 52 are "600 dpi, monochrome, 256 levels of halftones", the specifications of the image processing circuit 62 on the printer 61 side are set to generate image data of "600 dpi, color K (black), 256 levels of halftones" by using image data of "1,200 dpi, color K (black), 256 levels of halftones" that are output from the scanner 52. It should be noted that data 0 are transferred in view of CMY colors in generating image data in the image processing circuit 62 on the printer 61 side in this case.

Similarly, in case of using a printer 61 which original specifications are "1,200 dpi, monochrome, 2 levels of halftones" and the specifications of the scanner 52 are "600 dpi, colored, 256 levels of halftones", the specifications of the image processing circuit 62 on the printer 61 side are set to generate similar image data of "1,200 dpi, monochrome, 2 levels of halftones" by using image data of "600 dpi, CMYK colors, 256 levels of halftones" that are output from the scanner 52.

In case specifications for the scanner 52 are "1,200 dpi, monochrome, 2 levels of halftones", the specifications of the image processing circuit 62 on the printer 61 side are set to generate image data of "1,200 dpi, color K (black), 2 levels of halftones" by using image data of "1,200 dpi, color K (black), 2 levels of halftones" that are output from the scanner 52.

Further, in case specifications for the scanner 52 are "600 dpi, monochrome, 256 levels of halftones", the specifications of the image processing circuit 62 on the printer 61 side are set to generate image data of "1,200 dpi, color K (black), 2 levels of halftones" by using image data of "600 dpi, color K (black), 256 levels of halftones" that are output from the scanner 52.

Similarly to this, in case of using a printer 61 which original specifications are "600 dpi, monochrome, 256 levels of halftones" and the specifications of the scanner 52 are "600 dpi, colored, 256 levels of halftones", the specifications of the image processing circuit 62 on the printer 61 side are set to similarly generate image data of "600 dpi, color K (black), 256 levels of halftones" by using image data of "600 dpi, CMYK colors, 256 levels of halftones" that are output from the scanner 52.

In case specifications for the scanner 52 are "1,200 dpi, monochrome, 2 levels of halftones", the specifications of the image processing circuit 62 on the printer 61 side are set to generate image data of "600 dpi, color K (black), 256 levels of halftones" by using image data of "1,200 dpi, color K (black), 2 levels of halftones" that are output from the scanner 52.

Further, in case specifications for the scanner 52 are "600 dpi, monochrome, 256 levels of halftones", the specifications of the image processing circuit 62 on the printer 61 side are set to generate image data of "600 dpi, color K (black), 256 levels of halftones" by using data of "600 dpi, color K (black), 256 levels of halftones" that are output from the scanner 52.

As described above, by setting specifications for the image processing circuit 62 on the printer 61 side based on circuit data selected from the circuit data file 57 in accordance with specification information of the image processing circuit 55 provided on the scanner 52 side such that the specifications are identical to the specification information in performing copying processes by using the above image processing system 50, it will be possible to perform copying processes by mutually connecting scanner 52 and printer 61 which specifications related to resolution, colored/monochrome and number of halftones differ.

Figure 13:
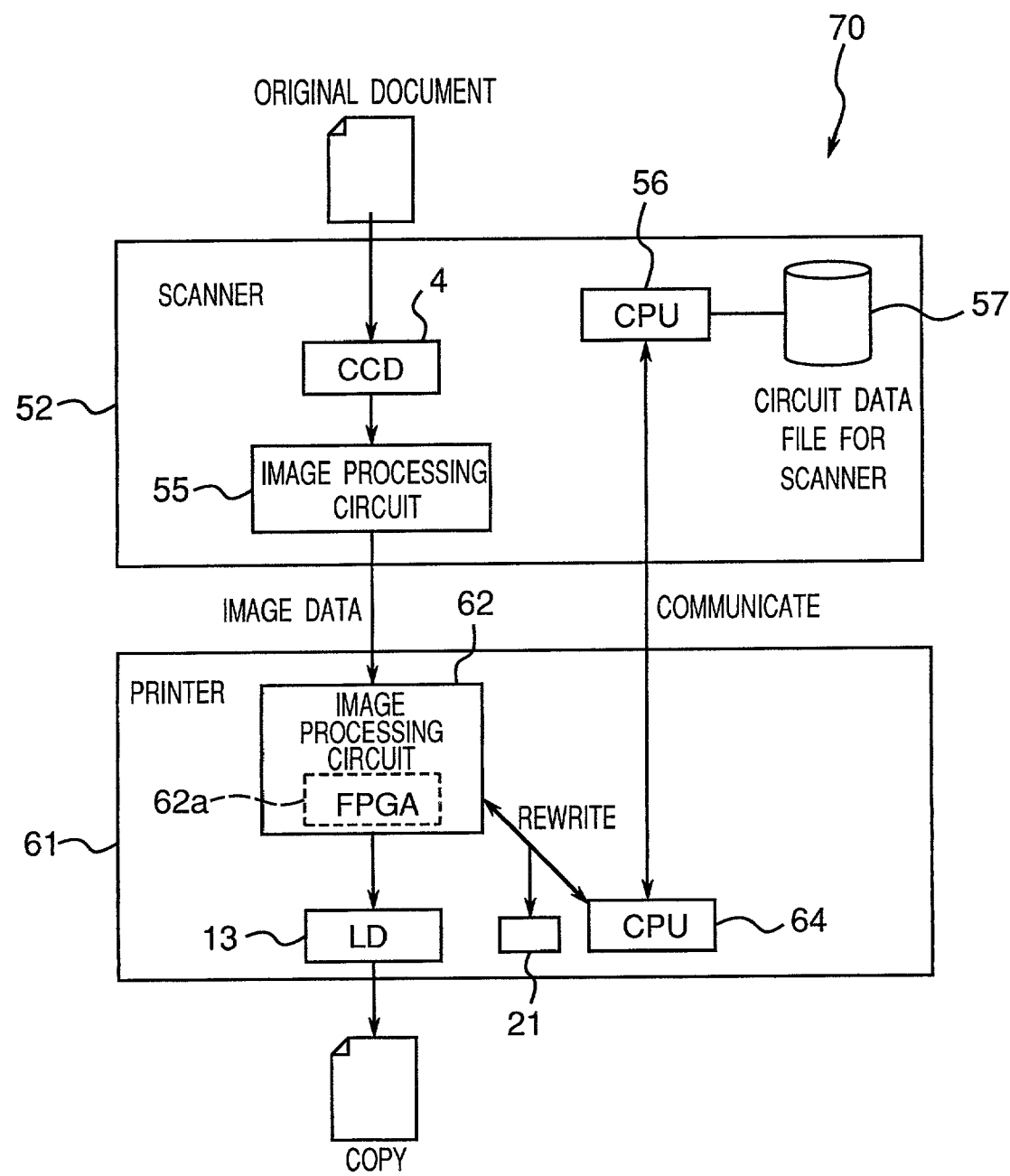
FIG. 13 is an explanatory view illustrating an arrangement of a modified example of the image processing system according to the third form of embodiment.

In an image processing system 70 as illustrated in FIG. 13, the non-volatile memory 21 for communicating with the CPU 64 and the image processing circuit 62 is provided on the printer 61 side. In setting specifications for the image processing circuit 52, the image processing system 70 is arranged in that circuit data, which are selected from the circuit data file 57 to the image processing circuit 62 through the CPUs 56, 64, are stored in the non-volatile memory 21. With this arrangement, circuit data are maintained in the non-volatile memory 21 also after switching the power source of the printer 61 OFF. In case the power source of the printer 61 is repeatedly switched ON and specifications are requested that are identical those of the previous time, circuit data that have been stored at the previous time of transfer are directly supplied from the non-volatile memory 21 to the image processing circuit 62. It is consequently possible to eliminate the necessity of repeatedly selecting circuit data from the circuit data file 57 and transferring the circuit data through a specified communicating line, to eliminate the time for transferring circuit data and to thus shorten the boot times for the devices.

Figure 14:
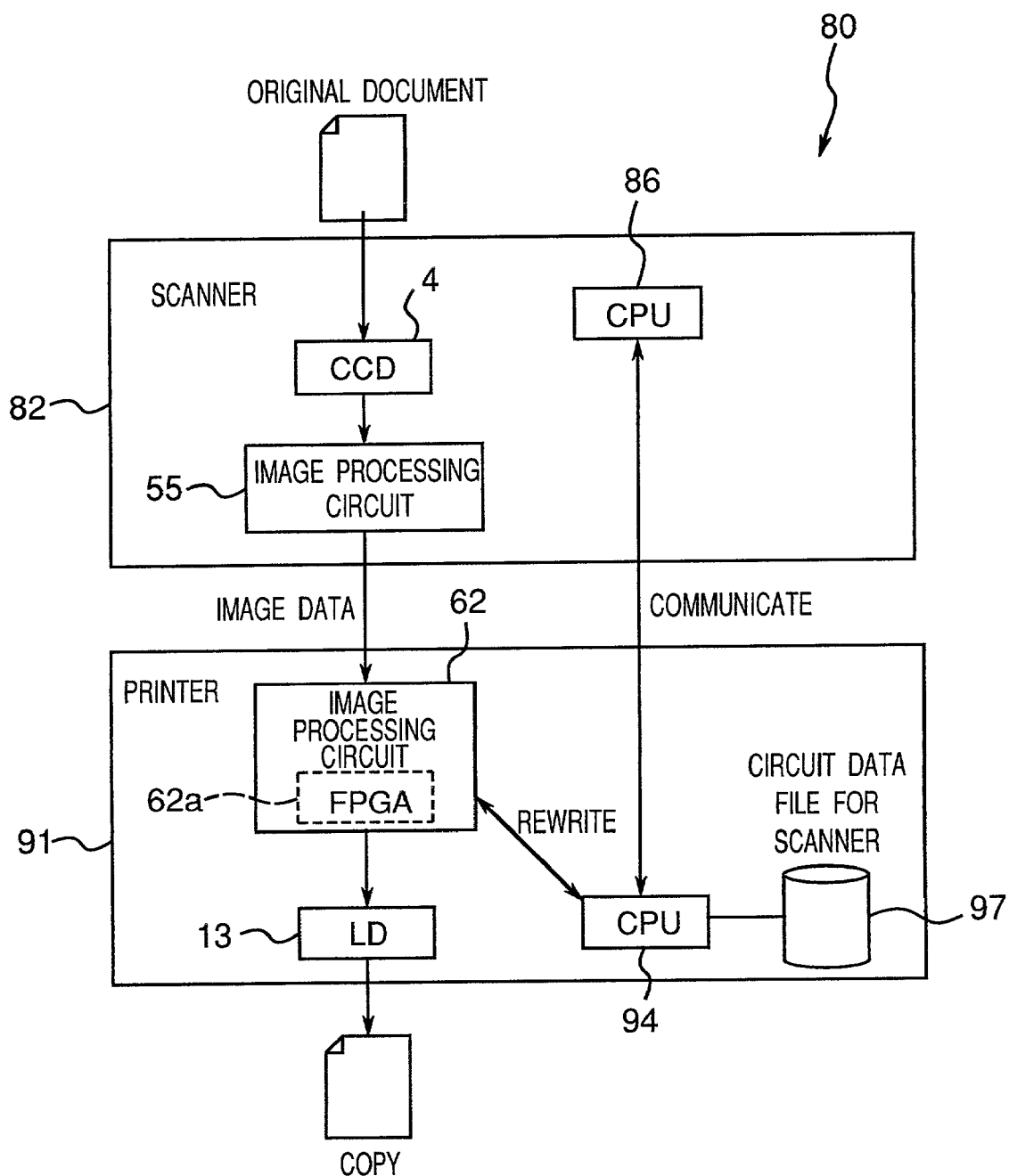
FIG. 14 is an explanatory view illustrating an arrangement of the image processing system according to a fourth form for embodying the present invention.

FIG. 14 is an explanatory view illustrating an arrangement of the image processing system according to a fourth form for embodying the present invention. The image processing system 80 is of similar arrangement as that of the above-described third embodiment wherein the circuit data file 97 for storing a plurality of circuit data that are supplied to an image processing circuit 62 on a printer 91 side is provided on the printer 91 side.

Specifications for the image processing circuit 55 on the scanner 82 side are set in the following manner for performing copying processes using the image processing system 80.

In a condition in which the scanner 82 and the printer 91 are mutually connected, communication is performed between CPU 86 and CPU 94 that are incorporated in these members for identifying specifications of the image processing circuit 55 on the scanner 82 side, whereupon circuit data corresponding to these specifications are selected in the printer 91 from among the circuit data file 97 that is provided within the printer 91. The selected circuit data are transferred to the image processing circuit 62 through the CPU 94, whereupon the logic modules and wiring regions of FPGA 62a are connected on the basis of the circuit data to thereby set the specifications. With this arrangement, the image processing circuit 62 may perform processing of image data in accordance with specifications that are identical to specifications that are employed in the image processing circuit 55 on the scanner 82 side.

In an image processing system 100 as illustrated in FIG. 15, the non-volatile memory 21 for communicating with the CPU 94 and the image processing circuit 62 is provided on the printer 91 side. In setting specifications for the image processing circuit 62, the image processing system 100 is arranged in that circuit data, which are selected from the circuit data file 97 to the image processing circuit 62 through the CPUs 86, 94, are stored in the nonvolatile memory 21. With this arrangement, circuit data are maintained in the non-volatile memory 21 also after switching the power source of the printer 91 OFF. In case the power source of the printer 91 is repeatedly switched ON and specifications are requested that are identical those of the previous time, circuit data that have been stored at the previous time of transfer are directly supplied from the non-volatile memory 21 to the image processing circuit 62. It is consequently possible to eliminate the necessity of repeatedly selecting circuit data from the circuit data file 97 and transferring the circuit data through a specified communicating line, to eliminate the time for transferring circuit data and to thus shorten the boot times for the devices.

FIG. 16 is an explanatory view illustrating an arrangement of the image processing system according to a fifth form for embodying the present invention.

This image processing system 110 includes scanners which are a color scanner 112A and a monochrome scanner 112B having a resolution of 1,200 dpi and printers which are a color printer 121A, a monochrome printer 121B having a resolution of 1,200 dpi and a monochrome printer 121C having a resolution of 600 dpi. The scanners 112A, 112B are respectively connected to the printers 121A, 121B and 121C through specified communicating lines, and it is possible to perform communication between CPUs 116A, 116B provided on the scanners 112A, 112B sides and CPUs 124A, 124B and 124C provided on the printers 121A, 121B and 121C sides.

In the present embodiment, image processing circuits 115A, 115B, 122A, 122B and 122C that are incorporated in all of the scanners 112A, 112B and printers 121A, 121B and 121C may be set in accordance with specifications for processing image data on the basis of given circuit data. A circuit data file functioning as a means for storing circuit data that are sent to respective image processing circuits 115A, 115B, 122A, 122B and 122C is provided within the monochrome scanner 112B. Moreover, the printers 121A, 121B and 121C are respectively comprised with input units that are provided by a number corresponding to the types of scanners present (two in the present example) in this embodiment so that a required one may be selected when inputting image data from the scanners 112A, 112B for each image processing circuits 122A, 122B and 122C.

Specifications for the image processing circuits that are incorporated in both members are set in the following manner in performing copying processes by using the thus arranged image processing system 110.

Let us first consider a case in which specifications of the image processing circuits 122A, 122B and 122C on the printer sides are set in accordance with specifications of the image processing circuits 115A, 115B on the scanner sides. In such a case, specifications of the image processing circuits 115A, 115B on the scanner sides are identified through communication between the CPUs 116A, 116B on the scanner sides and the CPUs 124A, 124B and 124C on the printer sides. The printer 121A, 121B and 121 respectively selects circuit data from among a circuit data file 117 provided within the monochrome scanner 112B through the communicating lines in accordance with specifications of either one of the circuits. The selected circuit data are transferred to the respective image processing circuits 122A, 122B and 122C by passing through the CPU 116B of the monochrome scanner 112B and the respective CPUs 124A, 124B and 124C on the printer sides.

In the respective image processing circuits 122A, 122B and 122C, logic modules and wiring regions of respective FPGAs 122a, 122b and 122c are connected on the basis of the circuit data that have been selected from the circuit data file 117 for setting specifications thereof. With this arrangement, the respective image processing circuits 122A, 122B and 122C may generate image data with specifications that are identical to the specifications of the image processing circuits 115A and 115B on the scanner sides.

It will next be considered a case in which specifications of the image processing circuits 115A and 115B on the scanner sides are set in accordance with specifications of the image processing circuits 122A, 122B and 122C. In such a case, specifications of the image processing circuits 122A, 122B and 122C on the printer sides are identified through communication between the CPUs 116A, 116B on the scanner sides and the CPUs 124A, 124B and 124C on the printer sides. The scanners 112A and 122B respectively select circuit data from among the circuit data file 117 provided within the monochrome scanner 112B through the communicating lines in accordance with specifications of either one of the circuits. The selected circuit data are transferred either to image processing circuit 115B by passing through the CPU 116B of the monochrome scanner 112B or to the image processing circuit 115A on the color scanner 112A side by passing through the CPU 116B on the monochrome scanner 112B side or the CPU 116A on the color scanner 112A side.

In the respective image processing circuits 115A and 115B, logic modules and wiring regions of respective FPGAs 115a and 115b are connected on the basis of the circuit data that have been selected from the circuit data file 117 for setting specifications thereof. With this arrangement, the respective image processing circuits 115A and 115B may generate image data with specifications that are identical to the specifications of the image processing circuits 122A, 122B and 122C on the printer sides.

As explained so far, the above-described image processing system 110 is arranged in that the circuit data file for storing therein circuit data for setting specifications for the respective image processing circuits is provided only on either one of the scanners (the monochrome scanner 112B) while providing a plurality of scanners and printers incorporating therein image processing circuits that may be set in accordance with specifications for processing image data on the basis of given circuit data, and in that circuit data, which are stored on the circuit data file, are transferred, when required, to the image processing circuits on the scanner or printer sides through the communicating lines, so that it is possible to keep the circuit scale to be minimum and to restrict increases in costs.

In the image processing system 110 in which a plurality of scanners 112A, 112B and printers 121A, 121B and 121C are connected through specified communicating lines, in case specifications of image processing circuits on the scanners 112A, 112B sides are, for instance, set in accordance with specification information of the printers 121A, 121B and 121C, an appliance that is incorporated with an image processing circuit that may be set in accordance with specifications on the basis of given circuit data needs to correspond to a plurality of appliances that are of different specifications such that a plurality of printers may be used as destinations for sending image data from a single scanner. In this case, an arrangement in which setting of specifications is performed on the scanner side each time the destination for transmitting the image data is switched would prolong the time require for the setting as a whole. Thus, the image processing circuits 115A, 115B on the scanners 112A, 112B sides or the image processing circuits 122A, 122B and 122C on the printers 121A, 121B and 121C sides are set to be of default specifications (that is, initially set specifications) in case a specified condition is met.

For instance, when considering a case in which specifications of the image processing circuits 115A, 115B on the scanners 112A, 112B sides are set in accordance with specification information of the printers 121A, 121B and 121C, the image processing circuits 115A, 115B on the scanners 112A, 112B sides are set to be of default specifications in this embodiment in case a single job for transmitting image data from the scanners 112A, 112B to the printers 121A, 121B and 121C has been completed or when standby conditions of the scanners 112A, 112B, in which no requests are being made from the printers 121A, 121B and 121C sides, are continuing beyond a specified time. The default specifications are set to be those suitable for the scanners 112A, 112B (e.g. their original specifications) or those that are relatively frequently used.

In this manner, by setting the specifications of the image processing circuits 115A, 115B on the scanners 112A, 112B sides to be those suitable for the scanners 112A, 112B (e.g. their original specifications) or those that are relatively frequently used in case a single job for transmitting image data from the scanners 112A, 112B to the printers 121A, 121B and 121C has been completed or when standby conditions of the scanners 112A, 112B, in which no requests are being made from the printers 121A, 121B and 121C sides, are continuing beyond a specified time, it is possible to reduce the frequency in which the image processing circuits 115A, 115B on the scanners 112A, 112B sides are set in accordance with specifications of destinations to which image data are to be sent from the scanners 112A, 112B upon switching, and an average time for setting specifications for the image processing circuits 115A, 115B can accordingly be reduced.

Figure 17A:
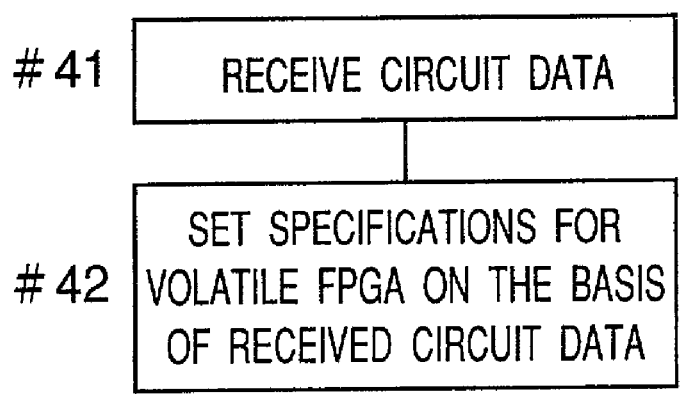
FIG. 17A is a flowchart illustrating generally performed processes for setting specifications of the image processing circuit in accordance with requests from the printer side in the image processing system according to the fifth form of embodiment.
Figure 17B:
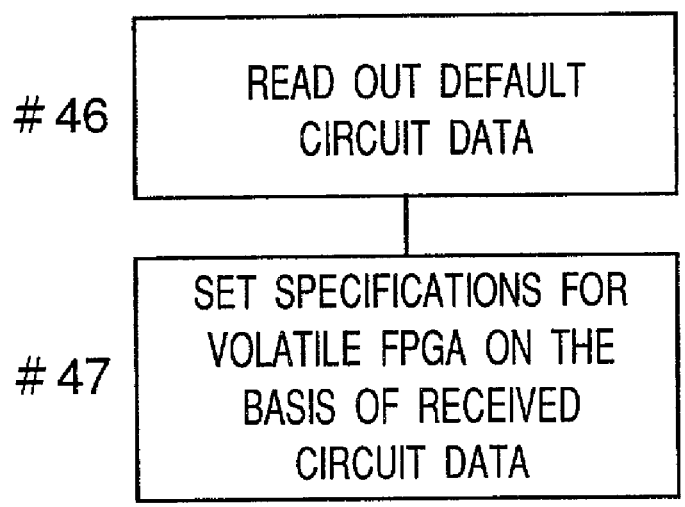
FIG. 17B is a flowchart illustrating processes for setting specifications of the image processing circuit in case a standby condition of a scanner of the image processing system according to the fifth form of embodiment is continuing beyond a specified time.
Figure 19:
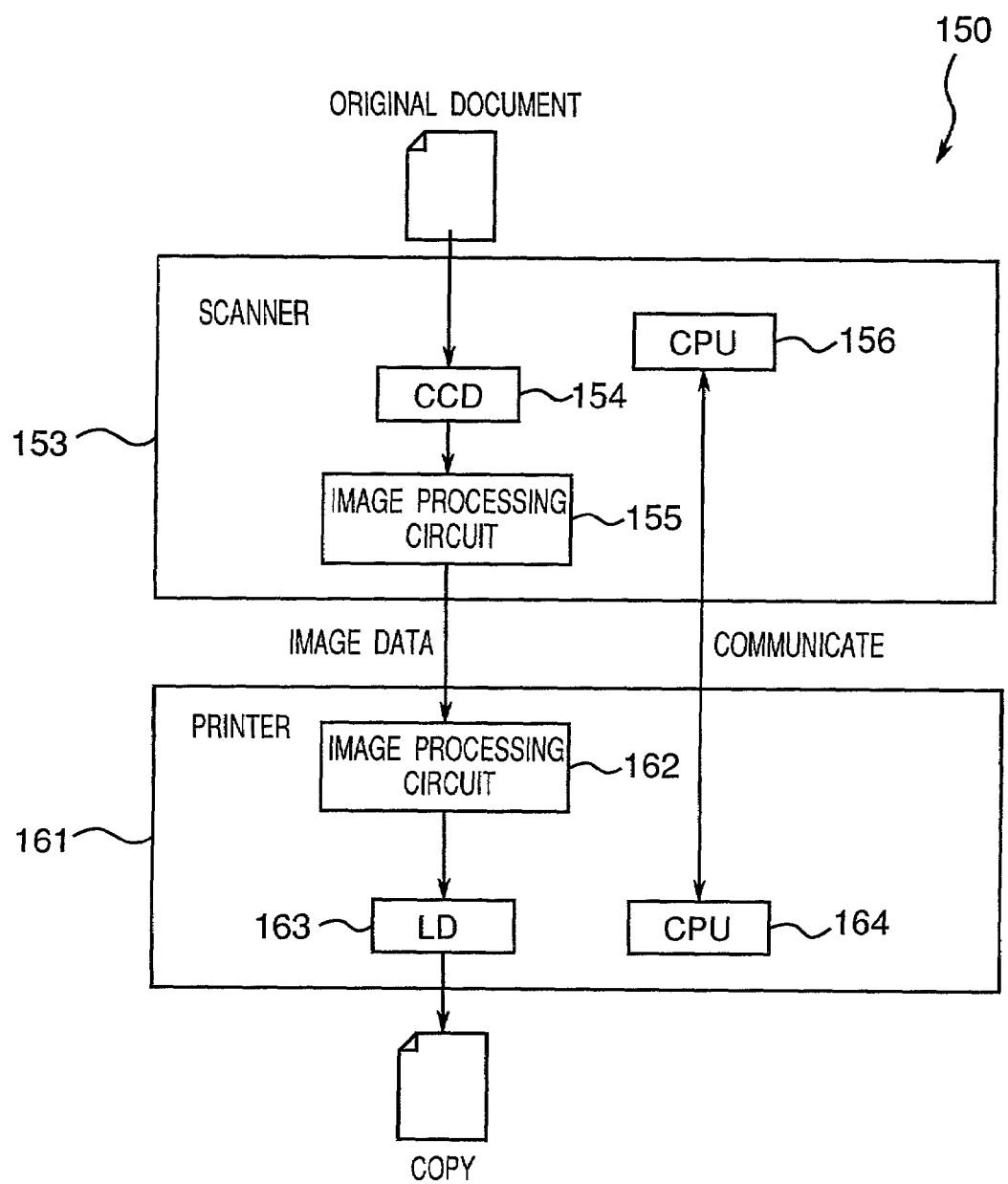
FIG. 19 is an explanatory view illustrating an arrangement of a conventional image processing system comprising a scanning device and a printing device.

FIGS. 17A and 17B are flowcharts illustrating generally performed processes for setting specifications of the image processing circuits 115A, 115B on the scanner sides 112A, 112B in accordance with requests from the printers 121A, 121B and 121C and for setting specifications of the image processing circuits 115A, 115B on the scanner sides 112A, 112B in case standby conditions of the scanners 112A, 112B are continuing beyond a specified time.

Upon request of the printers 121A, 121B and 121C for sending image data, the CPUs 116A, 116B on the scanners 112A, 112B receive circuit data that have been selected from among the circuit data file 7 on the basis of specifications of the printers 121A, 121B and 121C as illustrated in FIG. 17A (#41). Then, the received circuit data are sent from the CPUs 116A, 116B to the image processing circuits 115A, 115B, and specifications for processing image data on the basis of circuit data corresponding to specifications of the printers 121A, 121B and 121C are set in the image processing circuits 115A and 115B (#42).

On the other hand, in case no requests are being made from the printers 121A, 121B and 121C sides and standby conditions of the scanners 112A, 112B are continuing beyond a specified time, circuit data for providing default specifications are read out from the circuit data file 7 as illustrated in FIG. 17B (#46). These circuit data are sent to the image processing circuits 115A, 115B on the scanners 112A, 112B sides, and default specifications are set in the image processing circuits 115A, 115B based on the circuit data (#47).

In an image processing system 130 as illustrated in FIG. 18, non-volatile memories 21 are provided for respective pairs of image processing circuits 115A, 115B, 122A, 122B and 122C that may be set in accordance with specifications for processing image data and CPUs 116A, 116B, 124A, 124B, 124C. In setting specifications for the image processing circuits 115A, 115B or 122A, 122B and 122C, the image processing system 130 is arranged in that circuit data, which are selected from the circuit data file 117 to the respective image processing circuits, are stored in the respective non-volatile memory 21. With this arrangement, circuit data are maintained in the non-volatile memory 21 also after switching the power sources of the respective appliances OFF. In case the power sources of the scanners 112A, 112B or the printers 121A, 121B and 121C are repeatedly switched ON and specifications are requested that are identical those of the previous time, circuit data that have been stored at the previous time of transfer are directly supplied from the respective non-volatile memories 21 to the image processing circuits 115A, 115B or 122A, 122B and 122C. It is consequently possible to eliminate the necessity of repeatedly selecting circuit data from the circuit data file 117 and transferring the circuit data through specified communicating lines, to eliminate the time for transferring circuit data and to thus shorten the boot times for the devices.

It should be noted that the present invention is not limited to the illustrated forms of embodiment, and it goes without saying that various improvements and changes of design are possible without departing from the scope of the spirit of the present invention.

What is claimed is:

1. An image processing system comprised of an image reading device for optically reading original documents and converting these into electronic image data, and a printing device for printing image data that have been received from the image reading device onto recording media, the image processing system further comprising:
a first image processing unit that is provided on the image reading device side for processing read image data,
a second image processing unit that is provided on the printing device side for processing image data received from the image reading device with at least a part thereof being comprised by a device which circuit logic is variable,
a recording medium for storing a plurality of circuit arrangement information, and
a control unit for discriminating specifications for processing of the first image processing unit, selecting one of the plurality of circuit arrangement information in accordance with the discriminated specifications for processing, and setting a circuit logic for the second image processing unit based on the selected circuit arrangement information.

2. The image processing system as claimed in claim 1, wherein the specifications for processing that are discriminated by the control unit are specifications for processing related to at least one of resolution, colored/monochrome and number of halftones.

3. The image processing system as claimed in claim 1, wherein the recording medium is provided on the printing device side and in which the control unit acquires circuit arrangement information that is stored in the recording medium upon communication with the printing device.

4. The image processing system as claimed in claim 1, wherein the image processing system is further comprised with another image reading device that may communicate with the above-described image reading device and in which the control unit acquires circuit arrangement information that is stored in the recording medium upon communication with the other image reading device.

5. The image processing system as claimed in claim 1, wherein the image processing system is further comprised with a non-volatile memory provided on the image reading device side, and in which the control unit performs control such that circuit arrangement information acquired from the recording medium are stored in the non-volatile memory and that these circuit information are read from the non-volatile memory when necessary for setting the circuit logic for the second image processing unit.

6. The image processing system as claimed in claim 5, wherein the control unit reads circuit information from the non-volatile memory when switching the power source of the device ON for setting the circuit logic for the second image processing unit.

7. The image processing system as claimed in claim 1, wherein the control unit compares the newly acquired circuit arrangement information with circuit arrangement information that is in compliance with the currently set circuit logic for the second image processing unit and inhibits setting of a circuit logic for the second image processing unit based on the newly acquired circuit arrangement information in case both information are identical.

8. The image processing system as claimed in claim 1, wherein the control unit sets the circuit logic for the second image processing unit to be a circuit logic that is based on default specifications in case a specified condition is met.

9. The image processing system as claimed in claim 8, wherein the control unit sets the circuit logic for the second image processing unit to be a circuit logic that is based on default specifications upon completion of a single job in case the specified condition is completion of a single job in the image processing system.

10. The image processing system as claimed in claim 8, wherein the control unit sets the circuit logic for the second image processing unit to be a circuit logic that is based on default specifications when a standby time of the image processing system has exceeded a specified time in case the specified condition is the standby time of the image processing system.

11. The image processing system as claimed in claim 8, wherein the default specifications are specifications for processing that are most frequently used.

12. The image processing system as claimed in claim 5, wherein the recording medium is provided on the image reading device side.

13. The image processing system as claimed in claim 6, wherein the recording medium is provided on the image reading device side.

UNITED STATES PATENT AND TRADEMARK OFFICE
CERTIFICATE OF CORRECTION

PATENT NO. : 7,177,036 B2  
APPLICATION NO. : 09/726535  
DATED : February 13, 2007  
INVENTOR(S) : Nobuo Kamei et al.

It is certified that error appears in the above-identified patent and that said Letters Patent is hereby corrected as shown below:

Claim 5, Column 21, Line 46: delete "image reading"

Claim 5, Column 21, Line 47: add --printing-- [should read: printing device side, and in which the control unit . . .]

Signed and Sealed this

Twenty-ninth Day of May, 2007

JON W. DUDAS  
*Director of the United States Patent and Trademark Office*